United States Patent
Ji et al.

(10) Patent No.: US 11,382,109 B2
(45) Date of Patent: Jul. 5, 2022

(54) APPARATUS AND METHOD FOR SYNCHRONOUS MULTIPLEXING AND MULTIPLE ACCESS FOR DIFFERENT LATENCY TARGETS UTILIZING THIN CONTROL

(71) Applicant: QUALCOMM Incorporated, San Diego, CA (US)

(72) Inventors: Tingfang Ji, San Diego, CA (US); John Edward Smee, San Diego, CA (US); Joseph Binamira Soriaga, San Diego, CA (US); Naga Bhushan, San Diego, CA (US); Peter Gaal, San Diego, CA (US); Alexei Yurievitch Gorokhov, San Diego, CA (US); Krishna Kiran Mukkavilli, San Diego, CA (US); Michael Alexander Howard, Cardiff, CA (US); Rotem Cooper, San Diego, CA (US); Peter Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/578,139

(22) Filed: Sep. 20, 2019

(65) Prior Publication Data

US 2020/0015247 A1   Jan. 9, 2020

Related U.S. Application Data

(63) Continuation of application No. 14/533,923, filed on Nov. 5, 2014.

(Continued)

(51) Int. Cl.
*H04W 72/12* (2009.01)
*H04W 72/04* (2009.01)
*H04W 56/00* (2009.01)

(52) U.S. Cl.
CPC ..... *H04W 72/1231* (2013.01); *H04W 56/002* (2013.01); *H04W 72/042* (2013.01); *H04W 72/1247* (2013.01); *H04W 72/1278* (2013.01)

(58) Field of Classification Search
None
See application file for complete search history.

(56) References Cited

U.S. PATENT DOCUMENTS

| 6,466,557 B1 | 10/2002 | Doi |
| 6,587,444 B1 | 7/2003 | Lenzo et al. |

(Continued)

FOREIGN PATENT DOCUMENTS

| CN | 1451250 A | 10/2003 |
| CN | 1864362 A | 11/2006 |

(Continued)

OTHER PUBLICATIONS

European Office Action for European Patent No. EP18188252, dated May 28, 2020, 13 pages.

(Continued)

*Primary Examiner* — Christopher T Wyllie
(74) *Attorney, Agent, or Firm* — Qualcomm IP Dept.; James Hunt Yancey, Jr.

(57) ABSTRACT

Aspects of the disclosure provide for a thin control channel structure that can be utilized to enable multiplexing of two or more data transmission formats. For example, a thin control channel may carry information that enables ongoing transmissions utilizing a first, relatively long transmission time interval (TTI) to be punctured, and during the punctured portion of the long TTI, a transmission utilizing a (Continued)

second, relatively short TTI may be inserted. This puncturing is enabled by virtue of a thin channel structure wherein a control channel can carry scheduling information, grants, etc., informing receiving devices of the puncturing that is occurring or will occur. Furthermore, the thin control channel can be utilized to carry other control information, not being limited to puncturing information. Other aspects, embodiments, and features are also claimed and described.

20 Claims, 13 Drawing Sheets

Related U.S. Application Data

(60) Provisional application No. 62/000,443, filed on May 19, 2014.

(56) References Cited

U.S. PATENT DOCUMENTS

| | | | |
|---|---|---|---|
| 6,859,655 B2 | 2/2005 | Struhsaker et al. | |
| 7,751,843 B2 | 7/2010 | Butala | |
| 7,860,036 B2 | 12/2010 | Wang et al. | |
| 8,077,670 B2 | 12/2011 | Fan et al. | |
| 8,208,925 B2 | 6/2012 | Attar et al. | |
| 8,498,639 B2 | 7/2013 | Chen et al. | |
| 8,644,292 B2 | 2/2014 | Gorokhov et al. | |
| 8,670,376 B2 | 3/2014 | Damnjanovic et al. | |
| 8,797,983 B2 | 8/2014 | Sun | |
| 8,934,350 B2 | 1/2015 | Chen et al. | |
| 8,958,379 B2* | 2/2015 | He | H04L 5/1438 370/329 |
| 9,295,048 B2 | 3/2016 | Malladi et al. | |
| 9,320,062 B2 | 4/2016 | Malladi et al. | |
| 9,332,466 B2 | 5/2016 | Yang et al. | |
| 9,369,990 B2 | 6/2016 | Damnjanovic et al. | |
| 9,497,747 B2 | 11/2016 | Damnjanovic et al. | |
| 10,278,178 B2 | 4/2019 | Ji et al. | |
| 10,512,064 B1* | 12/2019 | Singh | H04W 72/1284 |
| 10,805,055 B2 | 10/2020 | Kishiyama et al. | |
| 2005/0013263 A1 | 1/2005 | Kim et al. | |
| 2006/0072508 A1 | 4/2006 | Zou et al. | |
| 2007/0171932 A1 | 7/2007 | Basuthakur et al. | |
| 2008/0009280 A1* | 1/2008 | Ushiki | H04W 72/042 455/425 |
| 2008/0279125 A1 | 11/2008 | Hottinen | |
| 2008/0310360 A1* | 12/2008 | Heo | H04L 1/0027 370/329 |
| 2009/0070650 A1* | 3/2009 | Bourlas | H04W 72/0466 714/748 |
| 2009/0080386 A1* | 3/2009 | Yavuz | H04W 52/0238 370/337 |
| 2009/0135748 A1 | 5/2009 | Lindoff et al. | |
| 2009/0180408 A1 | 7/2009 | Graybeal et al. | |
| 2009/0180433 A1* | 7/2009 | Ahn | H04W 52/54 370/329 |
| 2009/0245155 A1 | 10/2009 | Fukunaga et al. | |
| 2009/0257388 A1* | 10/2009 | Khandekar | H04W 16/14 370/329 |
| 2009/0262699 A1 | 10/2009 | Wengerter et al. | |
| 2009/0323625 A1 | 12/2009 | Lee et al. | |
| 2010/0027491 A1* | 2/2010 | Reina | H04W 52/346 370/329 |
| 2010/0039970 A1 | 2/2010 | Papasakellariou et al. | |
| 2010/0124183 A1* | 5/2010 | Sorond | H04L 5/14 370/280 |
| 2010/0210279 A1 | 8/2010 | Karaoguz | H04B 7/043 455/452.2 |
| 2010/0214996 A1 | 8/2010 | Santhanam | H04W 76/36 370/329 |
| 2010/0254268 A1* | 10/2010 | Kim | H04L 5/001 370/328 |
| 2011/0013581 A1 | 1/2011 | Lee et al. | |
| 2011/0044391 A1 | 2/2011 | Ji et al. | |
| 2011/0075624 A1 | 3/2011 | Papasakellariou et al. | |
| 2011/0085506 A1 | 4/2011 | Lee et al. | |
| 2011/0116465 A1* | 5/2011 | Miki | H04W 72/1215 370/329 |
| 2011/0164532 A1 | 7/2011 | Kawamura et al. | |
| 2011/0164536 A1* | 7/2011 | Lin | H04L 12/66 370/259 |
| 2011/0268075 A1 | 11/2011 | Heo et al. | |
| 2011/0273996 A1* | 11/2011 | Kim | H04J 11/0069 370/242 |
| 2011/0274031 A1 | 11/2011 | Gaal et al. | |
| 2011/0286397 A1* | 11/2011 | Kim | H04L 5/003 370/328 |
| 2011/0292890 A1 | 12/2011 | Kulkarni et al. | |
| 2011/0317615 A1 | 12/2011 | Soong et al. | |
| 2012/0004841 A1 | 1/2012 | Schunder et al. | |
| 2012/0039179 A1* | 2/2012 | Seo | H04L 5/0092 370/241 |
| 2012/0039283 A1 | 2/2012 | Chen et al. | |
| 2012/0044841 A1 | 2/2012 | Chen et al. | |
| 2012/0057500 A1 | 3/2012 | Nakayama | |
| 2012/0063324 A1 | 3/2012 | Kim et al. | |
| 2012/0069826 A1* | 3/2012 | Nakao | H04L 5/0053 370/336 |
| 2012/0099519 A1* | 4/2012 | Kim | H04L 5/00 370/315 |
| 2012/0122465 A1* | 5/2012 | Landstrom | H04W 72/1252 455/450 |
| 2012/0230238 A1 | 9/2012 | Dalsgaard et al. | |
| 2012/0250642 A1 | 10/2012 | Qu et al. | |
| 2012/0320846 A1* | 12/2012 | Papasakellariou | H04W 72/042 370/329 |
| 2012/0327916 A1* | 12/2012 | Ahn | H04L 1/1671 370/336 |
| 2013/0003929 A1 | 1/2013 | McNabb, Jr. et al. | |
| 2013/0021587 A1 | 1/2013 | Miyazaki et al. | |
| 2013/0021954 A1* | 1/2013 | Montojo | H04W 72/048 370/295 |
| 2013/0030158 A1 | 1/2013 | Sagi et al. | |
| 2013/0039291 A1* | 2/2013 | Blankenship | H04L 5/0037 370/329 |
| 2013/0045741 A1 | 2/2013 | Martin et al. | |
| 2013/0083737 A1 | 4/2013 | Earnshaw et al. | |
| 2013/0083740 A1 | 4/2013 | Eriksson et al. | |
| 2013/0107867 A1* | 5/2013 | Li | H04B 1/005 370/336 |
| 2013/0114517 A1* | 5/2013 | Blankenship | H04L 5/0094 370/329 |
| 2013/0128857 A1* | 5/2013 | Nakao | H04W 74/006 370/329 |
| 2013/0155915 A1 | 6/2013 | Park et al. | |
| 2013/0170406 A1 | 7/2013 | Kishiyama et al. | |
| 2013/0182623 A1* | 7/2013 | Fan | H04W 4/70 370/311 |
| 2013/0194981 A1 | 8/2013 | Wang et al. | |
| 2013/0201834 A1 | 8/2013 | Klingenbrunn et al. | |
| 2013/0215875 A1* | 8/2013 | Yang | H04W 72/0446 370/336 |
| 2013/0223366 A1* | 8/2013 | Papasakellariou | H04L 5/0094 370/329 |
| 2013/0225193 A1 | 8/2013 | Lee et al. | |
| 2013/0229940 A1 | 9/2013 | Baker et al. | |
| 2013/0242890 A1* | 9/2013 | He | H04L 1/1635 370/329 |
| 2013/0250903 A1 | 9/2013 | Ahn et al. | |
| 2013/0272187 A1* | 10/2013 | Malladi | H04L 5/0057 370/315 |
| 2013/0301503 A1 | 11/2013 | Park | |
| 2013/0301582 A1* | 11/2013 | Jiang | H04W 72/042 370/329 |
| 2013/0303214 A1* | 11/2013 | Ahmadi | H04W 72/1215 455/501 |
| 2013/0336302 A1 | 12/2013 | Lee et al. | |
| 2014/0008620 A1 | 1/2014 | Morohashi et al. | |
| 2014/0044095 A1* | 2/2014 | Li | H04W 72/1215 370/328 |

(56) References Cited

U.S. PATENT DOCUMENTS

| | | |
|---|---|---|
| 2014/0056184 A1 | 2/2014 | Yang et al. |
| 2014/0056188 A1* | 2/2014 | Yang ............... H04L 5/0053 370/280 |
| 2014/0086189 A1* | 3/2014 | Takeda ............. H04L 5/0055 370/329 |
| 2014/0086201 A1* | 3/2014 | Nagata ............. H04L 5/006 370/330 |
| 2014/0092856 A1 | 4/2014 | Yang et al. |
| 2014/0098780 A1* | 4/2014 | Kim ............... H04W 72/0446 370/329 |
| 2014/0133369 A1 | 5/2014 | Cheng et al. |
| 2014/0133452 A1 | 5/2014 | Nogami et al. |
| 2014/0153426 A1* | 6/2014 | Kim ............... H04L 5/0023 370/252 |
| 2014/0169238 A1* | 6/2014 | Cai ............... H04L 1/1887 370/280 |
| 2014/0192755 A1* | 7/2014 | Kim ............... H04W 72/042 370/329 |
| 2014/0198733 A1 | 7/2014 | Yin et al. |
| 2014/0204922 A1 | 7/2014 | Kim et al. |
| 2014/0211717 A1 | 7/2014 | Jitsukawa |
| 2014/0226607 A1* | 8/2014 | Holma ............. H04L 5/0055 370/329 |
| 2014/0286299 A1* | 9/2014 | Ihm ............... H04W 72/042 370/329 |
| 2014/0293840 A1 | 10/2014 | Beale |
| 2014/0293912 A1 | 10/2014 | Chao et al. |
| 2014/0307643 A1* | 10/2014 | Froberg ........... H04L 5/0053 370/329 |
| 2014/0334397 A1* | 11/2014 | Chen ............. H04L 5/0044 370/329 |
| 2014/0362832 A1 | 12/2014 | Rudolf et al. |
| 2014/0369245 A1* | 12/2014 | Pecen ............. H04W 52/0212 370/311 |
| 2015/0043355 A1 | 2/2015 | Kim et al. |
| 2015/0085766 A1* | 3/2015 | Kim ............... H04L 5/0041 370/329 |
| 2015/0110032 A1* | 4/2015 | Nagata ............. H04B 7/024 370/329 |
| 2015/0117348 A1 | 4/2015 | Takano et al. |
| 2015/0139104 A1 | 5/2015 | Seo et al. |
| 2015/0173101 A1* | 6/2015 | Webb ............. H04B 7/0632 370/329 |
| 2015/0181566 A1* | 6/2015 | Stopler ........... H04W 72/0413 370/329 |
| 2015/0264662 A1 | 9/2015 | Sahlin et al. |
| 2015/0264664 A1 | 9/2015 | Kawasaki et al. |
| 2015/0319021 A1* | 11/2015 | Xue ............... H04W 72/042 455/511 |
| 2015/0333898 A1* | 11/2015 | Ji ............... H04L 5/0005 370/280 |
| 2015/0334685 A1 | 11/2015 | Ji et al. |
| 2015/0334686 A1 | 11/2015 | Ji et al. |
| 2015/0334709 A1 | 11/2015 | Ji et al. |
| 2015/0334729 A1* | 11/2015 | Ji ............... H04W 72/1231 370/336 |
| 2015/0351116 A1* | 12/2015 | Shoshan ........... H04W 72/1226 370/330 |
| 2016/0007347 A1 | 1/2016 | Nagata et al. |
| 2016/0081107 A1 | 3/2016 | Yang et al. |
| 2016/0143035 A1 | 5/2016 | Xue et al. |
| 2016/0157103 A1* | 6/2016 | Teng ............. H04W 16/14 370/329 |
| 2016/0164622 A1 | 6/2016 | Yi et al. |
| 2016/0262137 A1 | 9/2016 | Behravan et al. |
| 2016/0381587 A1 | 12/2016 | Alexey et al. |
| 2017/0208584 A1* | 7/2017 | Qu ............... H04L 5/0035 |
| 2017/0318564 A1* | 11/2017 | Lee ............... H04L 1/00 |
| 2020/0015248 A1* | 1/2020 | Ji ............... H04W 72/1231 |
| 2020/0260421 A1* | 8/2020 | Takeda ............. H04L 5/0096 |
| 2021/0329636 A1 | 10/2021 | Ji et al. |

FOREIGN PATENT DOCUMENTS

| | | |
|---|---|---|
| CN | 1921322 A | 2/2007 |
| CN | 1943141 A | 4/2007 |
| CN | 101141801 A | 3/2008 |
| CN | 201094150 Y | 7/2008 |
| CN | 101277167 A | 10/2008 |
| CN | 101868028 A | 10/2010 |
| CN | 101917773 A | 12/2010 |
| CN | 102077670 A | 5/2011 |
| CN | 102149124 A | 8/2011 |
| CN | 102273250 A | 12/2011 |
| CN | 102291790 A | 12/2011 |
| CN | 102300244 A | 12/2011 |
| CN | 101485216 B | 1/2012 |
| CN | 102362447 A | 2/2012 |
| CN | 102474298 A | 5/2012 |
| CN | 102651675 A | 8/2012 |
| CN | 102792656 A | 11/2012 |
| CN | 102934504 A | 2/2013 |
| CN | 102948103 A | 2/2013 |
| CN | 103139819 A | 6/2013 |
| CN | 103262440 A | 8/2013 |
| CN | 103354537 A | 10/2013 |
| CN | 103873186 A | 6/2014 |
| CN | 104620629 A | 5/2015 |
| EP | 2547058 A2 | 1/2013 |
| EP | 2613600 A1 | 7/2013 |
| EP | 2725753 A1 | 4/2014 |
| EP | 2879456 A1 | 6/2015 |
| GB | 2506153 A | 3/2014 |
| JP | 2007529934 A | 10/2007 |
| JP | 2011512064 A | 4/2011 |
| JP | 2012054711 A | 3/2012 |
| JP | 2013102394 A | 5/2013 |
| JP | 2014027429 A | 2/2014 |
| JP | 2014078807 A | 5/2014 |
| KR | 20110013425 A | 2/2011 |
| KR | 20130085983 A | 7/2013 |
| KR | 20140040733 A | 4/2014 |
| RU | 2464709 C2 | 10/2012 |
| RU | 2012118758 A | 11/2013 |
| RU | 2012135724 A | 4/2014 |
| TW | 201406095 A | 2/2014 |
| TW | 201406180 A | 2/2014 |
| TW | 201431393 A | 8/2014 |
| WO | 2004012361 | 2/2004 |
| WO | 2005088866 A1 | 9/2005 |
| WO | 2007025160 A2 | 3/2007 |
| WO | 2007025260 A2 | 3/2007 |
| WO | 2008098223 A2 | 8/2008 |
| WO | 2009036086 A1 | 3/2009 |
| WO | 2009063001 A2 | 5/2009 |
| WO | 2010019523 A1 | 2/2010 |
| WO | 2010019679 A2 | 2/2010 |
| WO | 2010057008 A1 | 5/2010 |
| WO | 2010124438 A1 | 11/2010 |
| WO | 2012044988 A1 | 4/2012 |
| WO | 2012161914 A1 | 11/2012 |
| WO | 2013041138 A1 | 3/2013 |
| WO | 2013073899 A1 | 5/2013 |
| WO | 2013112703 A2 | 8/2013 |
| WO | 2013168467 A1 | 11/2013 |
| WO | 2013168974 A1 | 11/2013 |
| WO | 2013192601 A2 | 12/2013 |
| WO | 2014041480 A1 | 3/2014 |
| WO | 2014045015 A1 | 3/2014 |
| WO | 2014047860 A1 | 4/2014 |
| WO | 2014148962 A1 | 9/2014 |
| WO | 2014205742 A1 | 12/2014 |
| WO | 2015179134 A1 | 11/2015 |
| WO | 2015179135 A1 | 11/2015 |
| WO | 2015179136 A1 | 11/2015 |
| WO | 2015179145 A1 | 11/2015 |

(56) References Cited

FOREIGN PATENT DOCUMENTS

WO     2015179146 A1     11/2015
WO     WO-2017085978 A1 *   5/2017   ............ H04W 76/10

OTHER PUBLICATIONS

Qualcomm Incorporated: "Compressed Mode Aspects of DCH Enhancements", 3GPP TSG-RAN WG1#76bis, R1-141702, Apr. 4, 2014, pp. 1-6, Internet URL: http://www.3gpp.org/ftp/tsg_ran/WG1_RL1/TSGR1_76b/Docs/R1-141702.zip.

3GPP TS 36.331: "3rd Generation Partnership Project; Technical Specification Group Radio Access Network; Evolved Universal Terrestrial Radio Access (E-UTRA); Radio Resource Control (RRC); Protocol specification", Release 12, V12.1.0, Retrieved from URL: http://www.3gpp.org/ftp/Specs/archive/36_series/36.331/36331-c10.zip, Retrieved on: Mar. 13, 2014, 356 Pages.

Ericsson: "Test Proposal for CA_39 A-41 A Performance Requirement," R4-141441, 3GPP TSG-RAN WG4 Meeting #70bis, San Jose Cabo, Mexico, Mar. 31-Apr. 4, 2014, pp. 1-2.

Huawei: "Control channel design in frequency domain", 3GPP R1-061402, May 12, 2006.

Huawei et al., "Way Forward on DCI Formats for TDD/FDD CA", 3GPP TSG RAN WG1 #76, R1-140978, Feb. 17, 2014, 3 pages.

International Search Report and Written Opinion—PCT/US2015/029637—ISA/EPO—dated Jul. 29, 2015.

Motorola Mobility: "Handling Overlap of EPDCCH and PDSCH Resources", 3GPP TSG-RAN WG1#70 T1-123786, France, 3GPP, Aug. 5, 2012, pp. 1-3.

Nsn, et al., "IoT indication for Inter-Band TDD CA with Different UL/DL configuration", 3GPP draft; 36331_CR1463_(REL-12)_R2-140987, 3rd Generation Partnership Project (3GPP), Mobile Competence Centre; 650 Route Des Lucioles; F-06921 Sophia-Antipolis Cedex; France, vol. RAN WG2_No. Prague, Czech Republic; Feb. 10, 2014-Feb. 14, 2014, Mar. 8, 2014 (Mar. 8, 2014), 12 Pages, XP050816411, Retrieved from the Internet: URL: http://www.3gpp.org/ftp/tsg_ran/WG2_RL2/Specifications/201403_draft_specs_after_RAN_63/ [retrieved on Mar. 8, 2014] "UE-EUTRA-Capability".

NTT DOCOMO: "Views on Remaining Open Issues on Dual Connectivity", 3GPP Draft; R1-142266, 3rd Generation Partnership Project (3GPP), Mobile Competence Centre; 658, Route Des Lucioles; F-06921 Sophia-Antipolis Cedex France, vol. RAN WG1, No. Seoul, Korea; May 19, 2014-May 23, 2014 May 18, 2014 (May 18, 2014), pp. 1-5, XP050789383, Retrieved from the Internet: URL: http://www.3gpp.org/ftp/Meetings_3GPP_SYNC/RAN1/RAN1/Docs/ [retrieved on May 18, 2014] section"2.5. Simultaneous Rx/Tx capability".

Qualcomm Incorporated: "Basic UE Capability Mode of Operation", 3GPP TSG-RAN WG1#77 R1-142463, France, 3GPP, May 10, 2014, pp. 1-5.

Qualcomm Incorporated: Basic UE Capability Mode of Operation, 3GPP TSG-RAN WG2#86 R2-142708, France, 3GPP, May 10, 2014, pp. 1-5.

Tsai, Lee & Chen, Summary of Official Letter, English Translation of Taiwan Office Action dated Aug. 30, 2018.

Decision on Appeal issued in U.S. Appl. No. 14/567,993 dated Feb. 8, 2021, 8 pages.

Decision on Appeal issued in U.S. Appl. No. 14/567,985 dated Jan. 28, 2021, 8 pages.

3GPP TS 36.211: "3rd Generation Partnership Project; Technical Specification Group Radio Access Network; Evolved Universal Terrestrial Radio Access (E-UTRA); Physical Channels and Modulation (Release 10)", 3GPP TS 36.211, V10.7.0, Feb. 2013, 101 Pages, Section 4, Retrieved from URL: https://www.3gpp.org/ftp/Specs/archive/36_series/36.211/36211-a70.zip Retrieved on May 17, 2021.

3GPP TS 36.300: 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 10), 3GPP TS 36.300, V10.8.0, Jun. 2012, 194 Pages, Section 5, Retrieved from URL: https://www.3gpp.org/ftp/Specs/archive/36_series/36.300/36300-a80.zip, Retrieved on May 17, 2021.

ETRI: "Downlink HARQ Timing in TDD-FDD Carrier Aggregation", 3GPP TSG RAN WG1 Meeting #74bis, R1-134330, Guangzhou, China, Oct. 7, 2013-Oct. 11, 2013, pp. 1-4, Sep. 28, 2013 (Sep. 28, 2013), 3GPP Server Release.

ITRI: "Maximum Number of DL HARQ Processes for TDD Interband CA with Different TDD UL-DL Configurations", 3GPP TSG-RAN WG1 Meeting #70bis, R1-124478, San Diego, USA, Oct. 8, 2012-Oct. 12, 2012, 7 Pages, Sep. 29, 2012 (Sep. 29, 2012), 3GPP Server Release.

Samsung, "Specification Support for FDD-TDD CA", 3GPP TSG RAN WG1 #74bis, R1-134168, Guangzhou, China, Oct. 7, 2013-Oct. 11, 2013, pp. 1-3, Sep. 28, 2013 (Sep. 28, 2013), 3GPP Server Release.

Alcatel-Lucent Shanghai Bell, et al., "Scheduling and HARQ Timing for TDD-FDD Carrier Aggregation", 3GPP TSG RAN WG1 Meeting #74bis, R1-134212, Guangzhou, China, Oct. 7-11, 2013, 4 Pages.

* cited by examiner

DL Channel Structure

DL/DL Multiplexing

*DL/DL Multiplexing*

DL/DL Multiplexing,
Scheduling Entity POV

UL Channel Structure

UL/UL Multiplexing

UL/UL Multiplexing

UL/UL Multiplexing,
Scheduling Entity POV

*Interference Management*

APPARATUS AND METHOD FOR SYNCHRONOUS MULTIPLEXING AND MULTIPLE ACCESS FOR DIFFERENT LATENCY TARGETS UTILIZING THIN CONTROL

PRIORITY CLAIM

This application is a continuation of U.S. patent application Ser. No. 14/533,923, filed in the United States Patent and Trademark Office on Nov. 5, 2014, which claims priority to and the benefit of Provisional Patent Application No. 62/000,443, filed in the United States Patent and Trademark Office on May 19, 2014. The entire contents of each of these applications are incorporated herein by reference as if set forth in their entirety and for all applicable purposes.

TECHNICAL FIELD

Aspects of the present disclosure relate generally to wireless communication systems, and more particularly, to synchronous multiplexing and multiple access for different latency targets utilizing a thin control channel.

BACKGROUND

Wireless communication networks are widely deployed to provide various communication services such as telephony, video, data, messaging, broadcasts, and so on. Such networks, which are usually multiple access networks, support communications for multiple users by sharing the available network resources.

Within such wireless networks a variety of data services may be provided, including voice, video, and emails More recently, wireless communication networks are being utilized for an even broader range of services, including mission critical applications and remote control applications such as tele-surgery, where real-time feedback is necessary. In such applications, very low latency is critical to enable a suitably high quality of service. That is, the time for information to be transmitted from a communication device, and a response received back at the communication device, may need to be extremely rapid, on the order of milliseconds.

As the demand for mobile broadband access continues to increase, research and development continue to advance wireless communication technologies not only to meet the growing demand for mobile broadband access, but to advance and enhance the user experience.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

One or more aspects of the present disclosure provide for a thin control channel structure. A thin control channel can be utilized to enable multiplexing of two or more data transmission formats. For example, a thin control channel may carry information that enables ongoing transmissions utilizing a first, relatively long transmission time interval (TTI) to be punctured, and during the punctured portion of the long TTI, a transmission utilizing a second, relatively short TTI may be inserted. Other differences between the first (punctured) transmission and second (puncturing) transmission can also be enabled, including differences in symbol duration or format, or different priorities of traffic, for example. This puncturing is enabled by virtue of a thin channel structure wherein a control channel can carry scheduling information, grants, etc. informing receiving devices of the puncturing that is occurring or will occur. Furthermore, the thin control channel can be utilized to carry other control information, not being limited to puncturing information.

In one aspect, the disclosure provides a method, apparatus, and computer-readable medium having code for implementing wireless communication utilizing an algorithm for synchronous multiplexing and multiple access for different latency targets utilizing thin control. Here, a scheduling entity may receive first data on an uplink data channel during a first TTI. The scheduling entity may further receive a scheduling request on an uplink feedback channel, the scheduling request being configured to request a grant of time-frequency resources for second data. The scheduling entity may further transmit control information on a downlink control channel during a second TTI that is shorter in duration than the first TTI and that overlaps a portion of the first TTI. The control information may include a second grant for time-frequency resources corresponding to the second data on the uplink data channel during the second TTI. The scheduling entity may further receive the second data on the uplink data channel during the second TTI.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
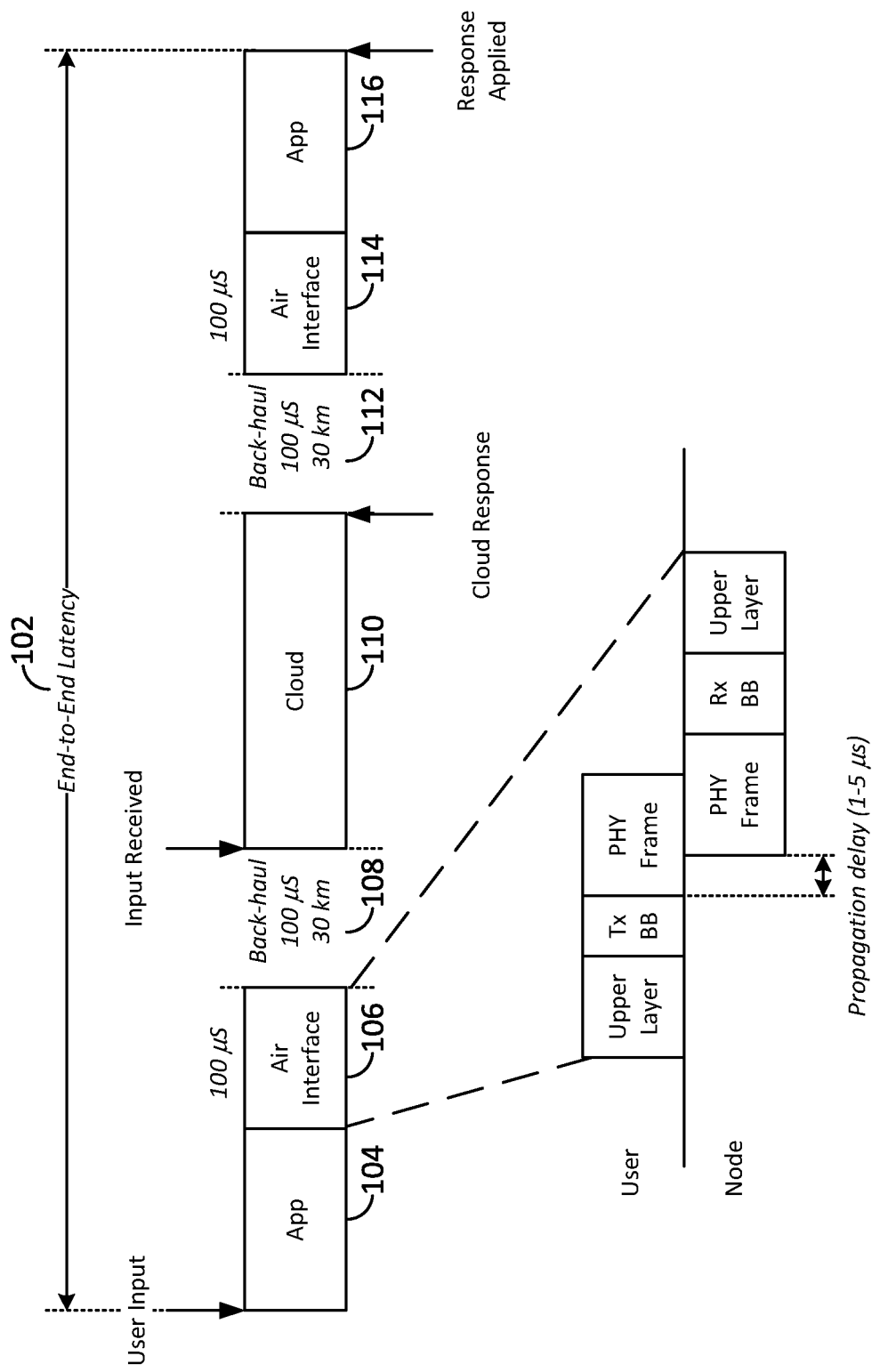
FIG. 1 is a schematic timing diagram illustrating components of end-to-end latency in a wireless communication system according to some embodiments.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The various concepts presented throughout this disclosure may be implemented across a broad variety of telecommunication systems, network architectures, and communication standards. For example, the $3^{rd}$ Generation Partnership Project (3GPP) is a standards body that defines several wireless communication standards for networks including the evolved packet system (EPS), frequently referred to as long-term evolution (LTE) networks. LTE networks can provide end-to-end latency between a transmitting device and a receiving device on the order of 50 ms, with over-the-air latency for a particular packet being in the range of 10 ms. Currently known LTE functionality provides for a round trip time (RTT) for certain feedback signaling (i.e., hybrid automatic repeat request (HARQ) signaling) of at least about 8 ms, using a transmission time interval (TTI) of 1 ms. Here, a TTI may correspond to a minimum duration for a unit of information that can independently be decoded. For time division duplex (TDD) LTE configurations, the uplink/downlink latency has a relatively fixed configuration, which takes around 10 ms to change. In general, LTE provides for a one-size-fits-all approach with all services and packets relying on these same latency ranges.

Evolved versions of the LTE network, such as a fifth-generation (5G) network, may provide for many different types of services or applications, including but not limited to web browsing, video streaming, VoIP, mission critical applications, multi-hop networks, remote operations with real-time feedback (e.g., tele-surgery), etc. Here, these different sets of services may benefit from having multiple latency targets that are drastically different from one another. However, the one-size-fits-all aspects of the LTE network described above can make the multiplexing of traffic with different latency targets very difficult.

The spectrum compatibility of a system that supports such diverse latency targets can be challenging. For example, the time multiplexing of regular/low latency traffic could violate the requirements of low latency packets. Furthermore, reserved frequency domain resources for low latency traffic would limit the peak rate and trunking efficiency. Thus, for next generation networks there is a need for new ways to support the ability to multiplex traffic and services having drastically different latency characteristics.

According to some aspects of the present disclosure, apparatus, methods, and computer instructions are disclosed, providing a channel structure that enables synchronous multiplexing of different classes of services and traffic having different latency targets by utilizing a certain thin control channel. This thin control channel may provide for fast signaling to enable the multiplexing of data with short and long transmission time intervals.

Referring now to FIG. 1, a schematic timing diagram is shown (not to scale) to illustrate a breakdown of various components of a total end-to-end latency in an example of a wireless communication system, which may correspond to some aspects of the present disclosure. In this example, a nominal end-to-end latency 102 is shown, representing the time between a user's input, corresponding to the usage of an application on a wireless communication device, and the response being applied to the application.

Based on the user input, there may be some time associated with application processing 104, followed by a further time delay associated with the air interface 106. In the illustration, this air interface portion of the total latency is further broken down to illustrate the air interface time. Here, the time associated with upper layer processing, transmitter baseband processing, and physical layer transmission of a frame from the wireless communication device represent a user portion of the air interface delay 106. After a propagation delay from the transmitting node to the receiving node, which may be in the range of 1-5 µs, the receiving node receives the physical layer frame, performs its own receiver baseband processing, and upper layer processing. This represents a receiving node portion of the air interface delay 106.

After the air interface component of the latency, the receiving node sends corresponding data through a suitable backhaul connection, with an associated backhaul propagation delay 108, which may be in the range of 100 µs for transmission in the range of 30 km. In many cases, this may be an optimistic estimate, and backhaul propagation distance may actually be hundreds of kilometers, resulting in correspondingly longer latencies. The "cloud" propagation delay 110 represents any suitable core network processing, with a period of latency that may take different amounts of time depending on needed processing and transport time. In some examples, the cloud portion of the end-to-end latency may be hundred(s) of µs. The process is then reversed, propagating across a suitable backhaul network 112 to a base station or other node, over an air interface 114 back to a receiving device, followed by application processing 116. At this point, the response is applied at the receiving device, resulting in the total end-to-end latency 102.

For advanced network topologies, such as 5G networks, it may be desired that such end-to-end latency 102 be roughly on the order of 1 ms. To meet this goal, the air interface portions 106 and 114 of the latency should each be in the range of 100 μs. To illustrate this latency, consider an example corresponding to transmission and processing of a ping packet. A ping packet may be a type of control packet that includes 32 bytes of information. If this packet is transmitted (after encoding) over five 256-bit frames, to achieve air interface latency of 20 μs, a link having a data rate of 12 Mbps (256 bits/20 μs) is required. Similarly, for data packets (such as IP packets) having an exemplary length of 1500 bytes (12 kb), if an air interface latency of 100 μs is desired, a link having a data rate of 120 Mbps (12 kb/100 μs) is required.

To enable data rates of this magnitude, advanced control mechanisms for the wireless communication network are needed. Furthermore, for many higher-rate applications, reduced total latency is desired. To provide for reduced latency in some applications, a reduced transmission time interval (TTI) may be desired.

As indicated above, one or more aspects of the present disclosure provide for a channel structure that enables multiplexing of a variety of different channels and waveforms, each of which may be optimized for different efficiency, latency, and/or reliability requirements. For example, various aspects of the disclosure describe a channel structure that is synchronous (e.g., time synchronous, with channel timing managed and controlled among the various communication nodes by way of a scheduling entity) and/or orthogonal (e.g., sharing the same resources in a way that communication nodes substantially do not interfere with one another).

Figure 2:
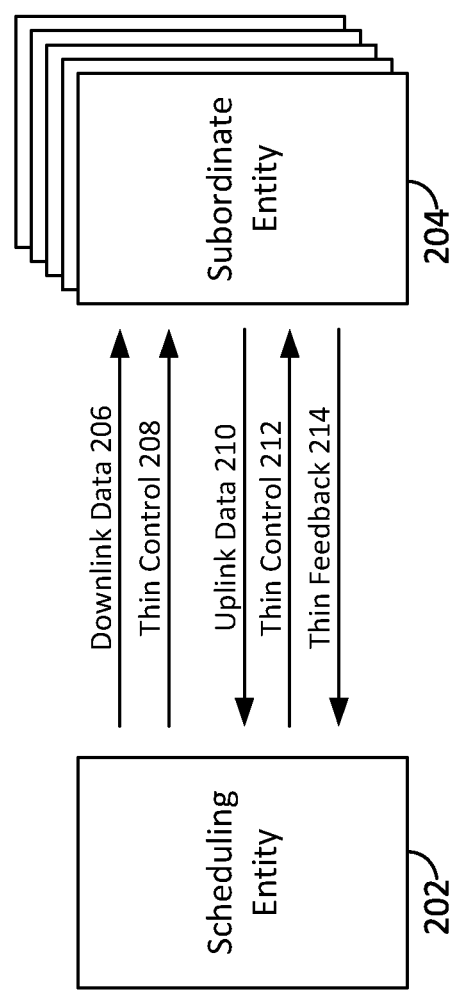
FIG. 2 is a block diagram conceptually illustrating an example of a scheduling entity communicating with one or more subordinate entities according to some embodiments.

Referring now to FIG. 2, a block diagram illustrates a scheduling entity 202 and a plurality of subordinate entities 204 engaged in wireless communication utilizing thin control channels 208/212 and thin feedback channel 214, described in further detail below. Of course, the channels illustrated in FIG. 2 are not necessarily all of the channels that may be utilized between a scheduling entity 202 and subordinate entities 204, and those of ordinary skill in the art will recognize that other channels may be utilized in addition to those illustrated, such as other control and feedback channels. As illustrated in FIG. 2, the scheduling entity 202 may broadcast downlink data 206 to one or more subordinate entities 204. In accordance with aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink data 210 from one or more subordinate entities to the scheduling entity 202. (Another way to describe the scheme may be to use the term broadcast channel multiplexing.) In accordance with aspects of the present disclosure, the term uplink may refer to a point-to-point transmission originating at a subordinate entity 204. Broadly, the subordinate entity 204 is a node or device that receives scheduling control information, including but not limited to scheduling grants, synchronization or timing information, or other control information from another entity in the wireless communication network such as the scheduling entity 202.

In a further aspect of the disclosure, the scheduling entity 202 may broadcast a thin control channel 208 and/or 212 to one or more subordinate entities 204. As described herein below, the use of a thin control channel 208/212 can enable modification/puncturing of uplink and/or downlink data being transmitted using a first, long transmission time interval (TTI), with other data (e.g., low latency (LoLat) packets) utilizing a second, short TTI. Here, a TTI may correspond to an encapsulated set or packet of information capable of being independently decoded, i.e., the shortest decodable transmission of information. In various examples, TTIs may correspond to frames, to data blocks, time slots, or other suitable groupings of bits for transmission.

In the description that follows, for ease of discussion it is assumed that the multiplexed data includes latency-tolerant data using a long TTI, and low-latency (LoLat) data using a short TTI. However, this is merely one example of the multiplexing of different types or categories of data that may be enabled utilizing the thin control channels disclosed herein. That is, those of ordinary skill in the art will comprehend that the thin control channels disclosed herein may be utilized for many rapid and relatively modifications to downlink data.

Furthermore, the subordinate entities 204 may transmit a thin feedback channel 214 to the scheduling entity 202. The thin feedback channel 214 may in some examples include a request for the scheduling entity to modify/puncture a first, long TTI with LoLat packets utilizing a second, short TTI. Here, in response to the request transmitted on the thin feedback channel 214, the scheduling entity 202 may transmit in the thin control channel 212 information that may schedule modification/puncturing of the long, first TTI with LoLat packets utilizing the second, short TTI. In a further example, the thin feedback channel 214 may include information about interference experienced at the subordinate entity 204, which the scheduling entity 202 may utilize dynamically to modify downlink transmissions in a way that may make further downlink transmissions more robust to the interference.

Figure 3:
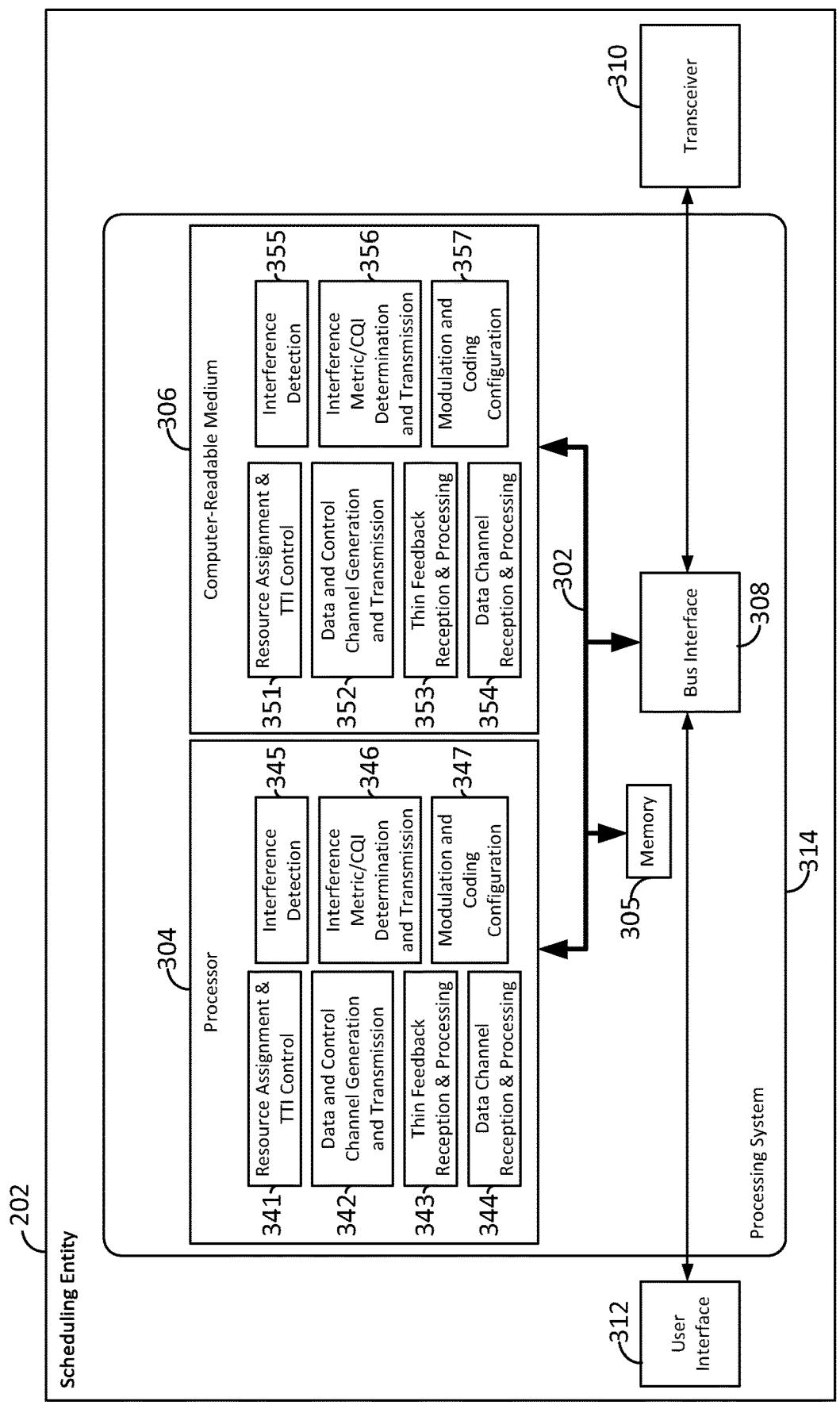
FIG. 3 is a block diagram illustrating an example of a hardware implementation for a scheduling entity employing a processing system according to some embodiments.

FIG. 3 is a conceptual diagram illustrating an example of a hardware implementation for an exemplary scheduling entity 202 employing a processing system 314. In accordance with various aspects of the disclosure, an element, or any portion of an element, or any combination of elements may be implemented with a processing system 314 that includes one or more processors 304.

In various aspects of the disclosure, the scheduling entity 202 may be any suitable radio transceiver apparatus, and in some examples, may be embodied by a base station (BS), a base transceiver station (BTS), a radio base station, a radio transceiver, a transceiver function, a basic service set (BSS), an extended service set (ESS), an access point (AP), a Node B, an eNode B (eNB), mesh node, relay, or some other suitable terminology. A base station may provide wireless access points to a core network for any number of user equipment (UE).

In other examples, the scheduling entity 202 may be embodied by a wireless UE. Examples of a UE include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, an entertainment device, a vehicle component, a wearable computing device (e.g., a smart watch, a health or fitness tracker, etc.), an appliance, a sensor, a vending machine, or any other similar functioning device. The UE may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 304, as utilized in a scheduling entity 202, may be used to implement any one or more of the processes described below and illustrated in FIGS. 7, 8, 11, 12, and/or 13.

In this example, the processing system 314 may be implemented with a bus architecture, represented generally by the bus 302. The bus 302 may include any number of interconnecting buses and bridges depending on the specific application of the processing system 314 and the overall design constraints. The bus 302 links together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 108 provides an interface between the bus 302 and a transceiver 310. The transceiver 310 provides a means for communicating with various other apparatus over a transmission medium. Depending upon the nature of the apparatus, a user interface 312 (e.g., keypad, display, speaker, microphone, joystick) may also be provided.

In some aspects of the disclosure, the processor 304 may include resource assignment and TTI control circuitry 341, configured to generate, schedule, and modify a resource assignment or grant of time-frequency resources. The resource assignment and TTI control circuitry 341 may further be configured to determine the TTI to utilize for uplink and downlink transmissions, e.g., whether data transmissions should utilize a first, long TTI, or a second, short TTI. The resource assignment and TTI control circuitry 341 may operate in coordination with resource assignment and TTI control software 351. The processor 304 may further include data and control channel generation and transmission circuitry 342, configured to generate and transmit uplink and downlink data and control channels, as well as uplink feedback channels and downlink control channels, including but not limited to a thin control channel, a thin feedback channel, and an assignment channel. The data and control channel generation and transmission circuitry 342 may operate in coordination with data and control channel generation and transmission software 352. The processor 304 may further include thin feedback reception and processing circuitry 343, configured to receive scheduling requests on an uplink feedback channel, the scheduling requests being configured to request a grant of time-frequency resources for uplink user data transmissions. In some examples, the thin feedback reception and processing circuitry 343 may further be configured to receive and process interference metrics including but not limited to a channel quality indicator (CQI). The thin feedback reception and processing circuitry 343 may operate in coordination with thin feedback reception and processing software 353. The processor 304 may further include data channel reception and processing circuitry 344, configured to receive and process user data on uplink data channels from one or more subordinate entities. The data channel reception and processing circuitry 344 may operate in coordination with data channel and reception and processing software 354. The processor 304 may further include interference detection circuitry 345, configured for detecting interference that interferes with uplink and/or downlink communication with one or more subordinate entities. The interference detection circuitry 345 may operate in coordination with interference detection software 355. The processor 304 may further include interference metric/channel quality indicator determination and transmission circuitry 346, configured to generate one or more of a channel quality indicator (CQI), persistency information relating to the interference, a frequency of the interference, a power of the interference, or spatial information corresponding to the interference. The interference metric/CQI determination and transmission circuitry 346 may operate in coordination with interference metric/CQI determination and transmission software 356. The processor 304 may further include modulation and coding configuration circuitry 347, configured for determining a modulation and coding scheme (MCS) to utilize for downlink transmissions and/or a MCS for a subordinate entity to utilize for uplink transmissions. The modulation and coding configuration circuitry 347 may operate in coordination with modulation and coding configuration software 357.

The processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 may also be used for storing data that is manipulated by the processor 304 when executing software.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 4:
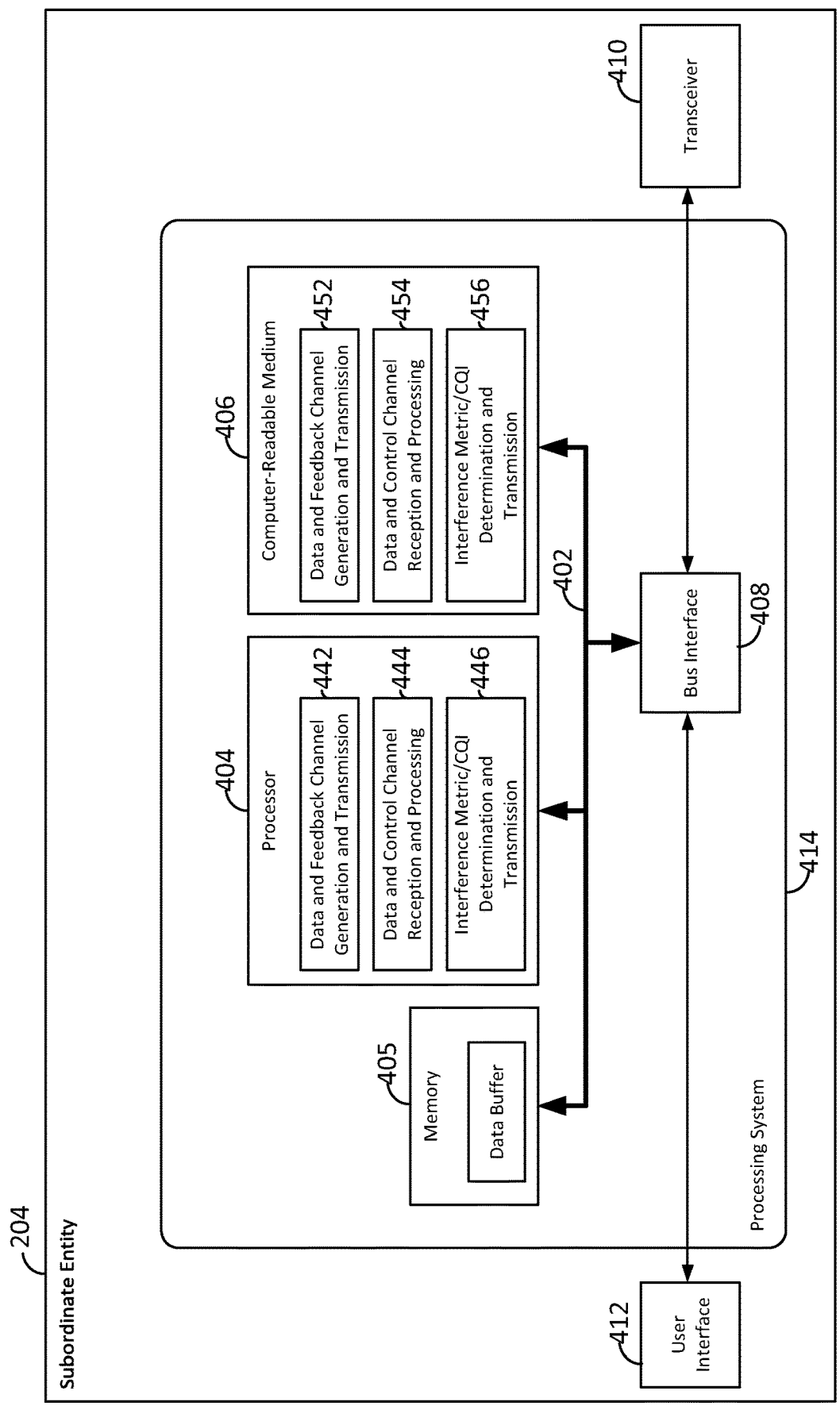
FIG. 4 is a block diagram illustrating an example of a hardware implementation for a subordinate entity employing a processing system according to some embodiments.

FIG. 4 is a conceptual diagram illustrating an example of a hardware implementation for an exemplary subordinate entity 204 employing a processing system 414. In accordance with various aspects of the disclosure, an element, or any portion of an element, or any combination of elements may be implemented with a processing system 414 that includes one or more processors 404.

The processing system 414 may be substantially the same as the processing system 314 illustrated in FIG. 3, including a bus interface 408, a bus 402, memory 405, a processor 404, and a computer-readable medium 406. Furthermore, the subordinate entity 204 may include a user interface 412 and a transceiver 410 substantially similar to those described above in FIG. 3. The processor 404, as utilized in a subordinate entity 204, may be used to implement any one or more of the processes described below and illustrated in FIGS. 7, 8, 11, 12, and/or 13.

In some aspects of the disclosure, the processor 404 may include data and feedback channel generation and transmission circuitry 442, configured to generate and transmit uplink data on a data channel, and to generate and transmit uplink feedback on a feedback channel. The data and feedback channel generation and transmission circuitry 442 may operate in coordination with data and feedback channel generation and transmission software 452. The processor 404 may further include data and control channel reception and processing circuitry 444, configured for receiving and processing downlink data on a data channel, and to receive and process control information on one or more downlink control channels. In some examples, received downlink data and/or control information may be temporarily stored in a data buffer within memory 405. The processor 404 may further include interference metric/channel quality information (CQI) determination and transmission circuitry 446, configured for detecting interference that interferes with uplink and/or downlink communication with one or more scheduling entities, and generating one or more of a CQI, persistency information relating to the interference, a frequency of the interference, a power of the interference, or spatial information corresponding to the interference, for transmission to the scheduling entity. The interference metric/CQI determination and transmission circuitry 446 may operate in coordination with the interference metric/CQI determination and transmission software 456.

As described below, some aspects of the disclosure provide for downlink-downlink multiplexing, wherein a scheduling entity may be enabled to multiplex low-latency downlink data alongside the ongoing transmission of high-latency data. Further aspects of the disclosure provide for uplink-uplink multiplexing, wherein, at the request of a subordinate entity, a scheduling entity may be enabled to schedule an opportunity for the subordinate entity to multiplex low-latency uplink data alongside the ongoing transmission of high-latency data.

Of course, these examples are merely provided to illustrate certain concepts of the invention. Those of ordinary skill in the art will comprehend that these are merely exemplary in nature, and other examples may fall within the scope of the disclosure and the appended claims, such as uplink-downlink multiplexing and downlink-uplink multiplexing.

DL/DL Multiplexing

Figure 5:
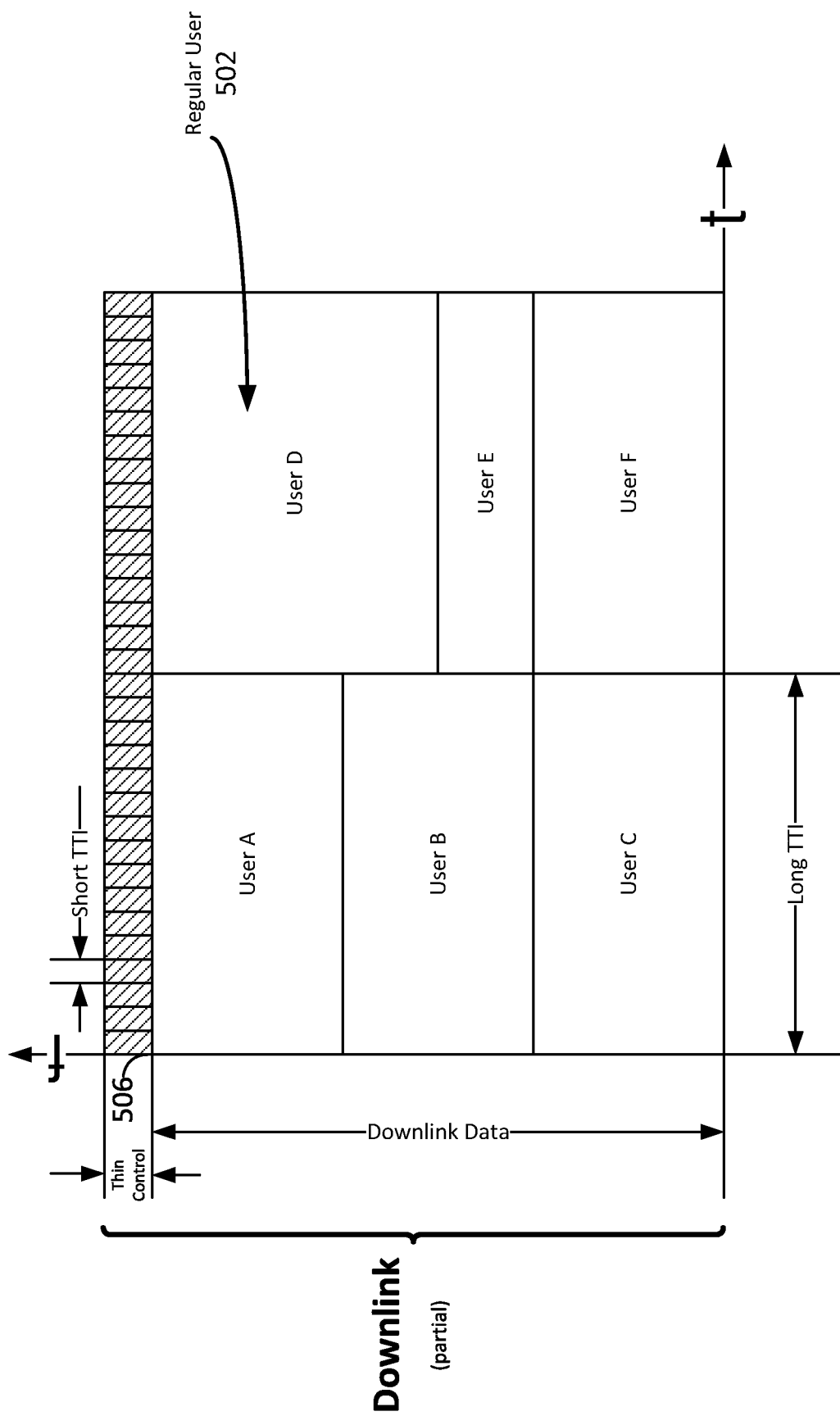
FIG. 5 is a schematic diagram illustrating an example of a synchronous multiple access channel structure for a downlink transmission including a thin control channel according to some embodiments.

FIG. 5 is a schematic illustration of an example of a synchronous multiple access channel structure including a thin control channel as it may be implemented according to some aspects of the present disclosure. In this illustration, the channel structure may be applicable to a downlink data transmission, i.e., a transmission from a scheduling entity to one or more subordinate entities. Of course, this channel structure is not limited to such a scheme, but rather may be generalized to be applicable to any link where the transmitting device is scheduling the traffic.

In the illustration, the horizontal axis (t) represents time, while the vertical axis (f) represents frequency (not to scale). Channel time-frequency resources for various users of the air interface occupy given areas within the channel, as identified in the different blocks. For example, some of the time-frequency resources may be utilized by "regular" users 502, which have less stringent latency requirements for their communication. In the illustration, as one example, six regular users 502 labeled User A, B, C, D, E, and F are each scheduled time-frequency resources as indicated by their respectfully labeled blocks. Of course, in various examples any number of users may be scheduled the use of resources. Further, while in the illustration all of the time-frequency resources are shown being assigned to regular users, in various examples some or even all of the time-frequency resources may be unassigned, or assigned for another purpose other than for regular user data.

In the context of the present disclosure, a regular user 502 may be a subordinate entity 204 that receives a resource assignment from a scheduling entity 202, where the resource assignment indicates for the subordinate entity 204 to utilize a long transmission time interval (TTI). Such regular users 502 may be more tolerant to latency in their communication, and may in some examples be more optimized for capacity. Accordingly, these users may utilize such longer TTIs for packets that can tolerate more latency than other users or other types of communication that might require low latency (LoLat) communication. A long TTI may broadly be any TTI that is longer than a short TTI, described in further detail below. In some examples, a long TTI may be a TTI that has a duration of a plurality of data symbols, or time slots. Some non-limiting examples of a long TTI may have a duration of 100 μs, 240 μs, or 1 ms. Of course, any suitable duration for a long TTI may be utilized within the scope of the disclosure.

Furthermore, as illustrated in FIG. 5, in addition to the downlink traffic channels used by the regular users 502, a thin control channel 506 may be utilized as illustrated. Here, the thin control channel 506 may be the same as one or both of the thin control channels 208/212 described above and illustrated in FIG. 2. Within the present disclosure, the thin control channel may lie in one or more frequency sub-band(s) outside of (e.g., above) the frequency sub-bands utilized by the traffic transmissions, such as the allocated time-frequency resources described above for regular users A-F 502. The width of the thin control channel 506 in the frequency direction may be reduced or minimized so as to reduce or minimize the amount of overhead utilized by the control channel 506.

In a further aspect, all active users (e.g., subordinate entities 204 including but not necessarily limited to the regular users 502) in communication with the scheduling entity 202 that broadcasts the thin control channel 506 may monitor (and, in some examples, buffer) the thin control channel 506 shown herein. Here, the terminology "thin" in reference to the control channel 506 may refer to a short or thin duration in time over which units of information may be transmitted over the channel. For example, as illustrated in FIG. 5, each time slot, symbol, or unit of the thin control channel 506 may correspond to the duration of a short TTI. That is, in some examples, the short TTI may correspond to the time duration of a single symbol. Some non-limiting examples of a short TTI may have a duration of 10 µs, 20 µs, 100 µs, or any other suitable duration that is shorter than the long TTI. In some examples, the long TTI may represent an integer multiple of short TTIs. In some examples, a common symbol duration may be utilized within both the long TTI and the short TTI, or in other examples, different symbol durations may be utilized within the long TTI and the short TTI.

The thin control channel 506 may carry any suitable control information for the subordinate entities 204, such as the regular users 502, including but not limited to scheduling or grants of time-frequency resources to utilize for uplink and/or downlink transmissions. In particular, as described in further detail below, the thin control channel 506 may enable a fast re-allocation of already-scheduled time-frequency resources to subordinate entities that may wish to communicate in a low-latency manner That is, the thin control channel 506 may be utilized in some examples to modify in-flight data (e.g., to modify an existing assignment of downlink resources to the regular users 502).

That is, at any time, one or more subordinate entities 204 in communication with the scheduling entity 202 may come to need low-latency (LoLat) communication with the network, wherein more stringent latency requirements for communication are needed than the relatively long latency resulting from the communication by regular users 502 utilizing the long TTI. Thus, in an aspect of the present disclosure, the thin control channel 506 may enable dynamic multiplexing of the traffic for one or more subordinate entities that desire low latency communication (hereinafter referred to as LoLat users 504), who can utilize a short TTI for data traffic, and the traffic for the regular users 502, who utilize the long TTI for data traffic.

Figure 6:
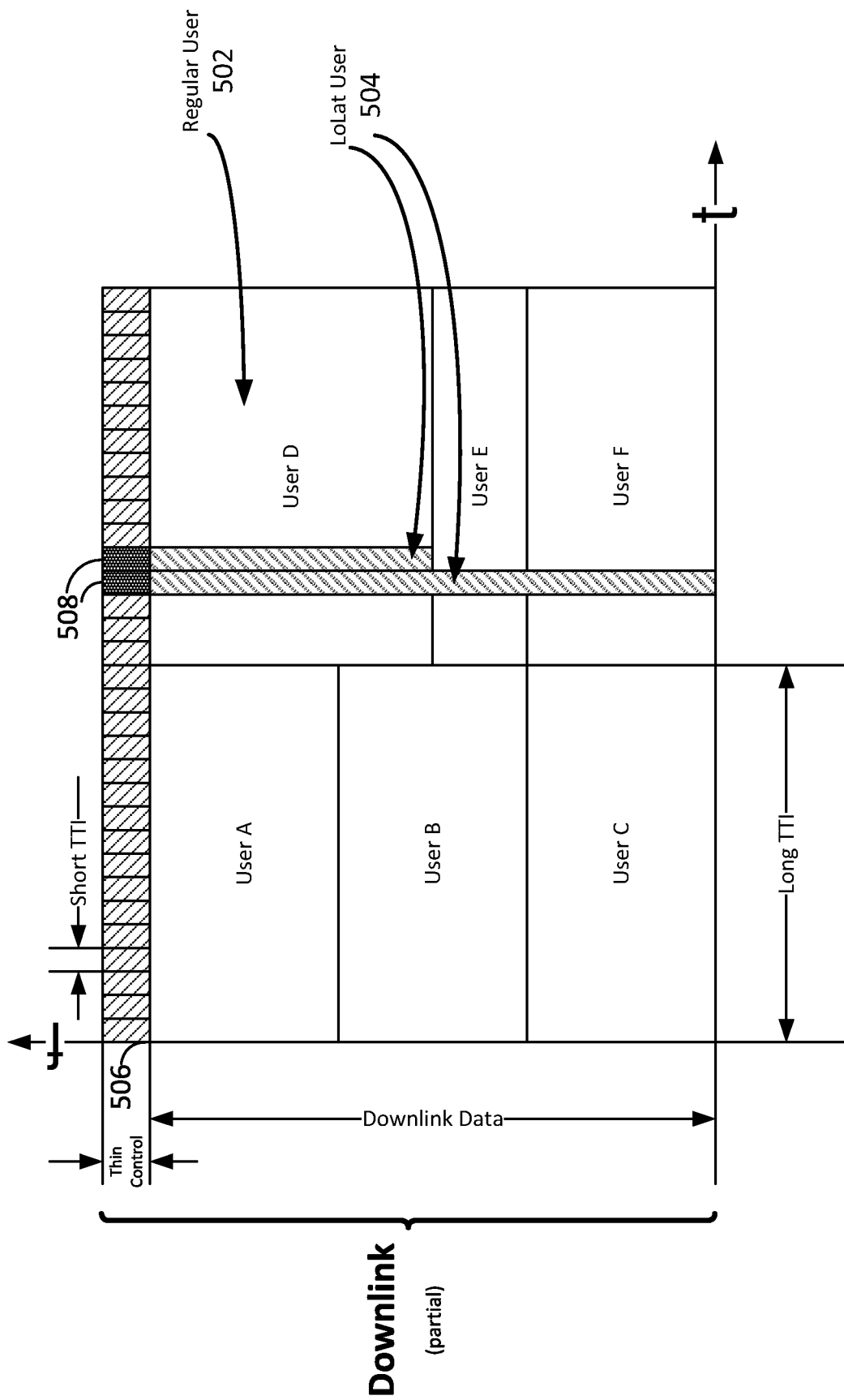
FIG. 6 is a schematic diagram illustrating downlink/downlink multiplexing utilizing a thin control channel according to some embodiments.

Referring now to FIG. 6, an example is illustrated to show an exemplary scheme for a re-allocation of time-frequency resources from one or more regular users 502 to one or more LoLat users 504. That is, a plurality of regular users 502 may be receiving downlink communications utilizing an existing assignment of time-frequency resources. Here, any suitable control channel, including but not necessarily limited to the thin control channel 506, may be utilized to grant resources to the various entities in the network, such that those subordinate entities 204 may receive downlink data according to their respective assignments. All active subordinate entities with in-flight data corresponding to their existing assignments may monitor the thin control channel 506, as described above, with the possible exception of any subordinate entities that have insufficient processing capabilities to do so. By monitoring the thin control channel 506, existing assignments of resources may be modified in accordance with control information on the thin control channel 506, such that ongoing traffic by regular users 502 may be replaced with information for the LoLat user 504.

That is, in an aspect of the disclosure, within a short TTI that overlaps a portion of one or more long TTIs, the scheduling entity 202 may transmit data designated for one or more LoLat user(s) 504. In some examples, to accommodate the LoLat transmission, the scheduling entity 202 may puncture the long TTI transmission (e.g., cease the downlink data transmission to the regular user 502) for the duration of one or more short TTIs. Here, when the regular data is punctured, it may be the case that some of the regular data is simply lost. In this example, forward error correction coding may be utilized to recover the user data in view of the lost symbols due to the puncturing. In another example, the scheduling entity 202 may implement rate matching to account for the puncturing of the regular user data. That is, the scheduling entity 202 may modify a portion of the regular data utilizing a rate matching algorithm to account for the lost resources. Those of ordinary skill in the art will understand a rate matching procedure, so the implementation details thereof are not provided herein. However, in essence, a rate matching algorithm configures an encoding algorithm for the data (e.g., the regular user data) to fit into allocated physical resources. Thus, when the puncturing described above removes a portion of these resources, a rate matching algorithm may actively adjust the encoding (e.g., by adjusting a coding rate) to account for the reduced amount of resources.

In another aspect of the disclosure, rather than puncturing the time-frequency resources for the regular user data, the data for the regular user 502 and the data for the LoLat user 504 may overlap. That is, both downlink transmissions may occupy the same time-frequency resources. Here, the receiving devices may be configured to account for the interference that may occur, or in other examples, such interference may result in what may be considered acceptable data losses. In a further example, modification of the regular user data transmission 502 may be made to account for the overlapped transmissions, e.g., by adjusting the rate matching algorithm as described above.

Accordingly, already allocated time-frequency resources may dynamically be re-allocated in real time from one user to another, as enabled by virtue of the thin control channel 506.

As illustrated in FIG. 6, at the same time as the downlink data for the LoLat user 504 is transmitted, information corresponding to the LoLat data may be carried on the thin control channel 506. For example, control information 508, transmitted on the thin control channel 506 during the short TTI(s) when the downlink data for LoLat users 504 is transmitted, may be a grant modification that informs the regular users 502 that resources during that short TTI are being taken away and reassigned to another user. In this way, the regular user 502 can know that, while it was originally expecting data on that resource, instead, the information on that resource is essentially random data or noise for that regular user 502.

The control information 508 may be structured in any suitable manner. As one example, the control information 508 may include an indication that a particular time-frequency resource, or a particular range of time-frequency resources, are being punctured or taken away from the regular user(s) 502. As illustrated in FIG. 6, the range in the frequency dimension of the puncturing may be the entirety of the used frequency channels or sub-bands allocated for downlink data, or in another example, the frequency range of the puncturing may be a portion of the frequency channels or sub-bands allocated for downlink data. In another example, the control information 508 may include information identifying a user for which its previously allocated time-frequency resource is being punctured. In still another example, the control information 508 may include information identifying which TTI or TTIs in which a resource modification is occurring. For example, the control information 508 need not necessarily occur within the same short TTI as the resource modification indicated in the control information 508. In still another example, the control information 508 may include information about an adjustment to a rate matching algorithm that may be utilized on any remaining regular user data that may be affected by its interruption by the LoLat user data 504.

That is, in the illustrated example, as described above, this control information 508 is transmitted during the same TTI as the information directed to the LoLat user 504. However, this is not the only example within the scope of the present disclosure. In other examples, the control information 508 may be carried during any suitable short TTI, before or even after the modified resource. That is, in some aspects of the disclosure, the regular users 502 may perform real-time processing of the information 508 in the thin control channel 506. However, in other aspects of the disclosure, the regular users 502 may not perform real-time processing of the information 508, since the regular users 502 may generally have a more relaxed timeline, where they can tolerate more latency and slower turnaround. To this end, the receiving subordinate entity 204 may include a data buffer in its memory 405, configured to buffer downlink data and thin control information for any given duration. As one illustrative example, the subordinate entity may buffer the data received for a suitable buffer time. Here, at the end of the buffer time, the receiving entity may process the received and buffered downlink data and thin control information. At this time, the information in the thin control channel, such as the control information 508, may be processed and applied to the buffered downlink data. Here, if the control information 508 indicates that any particular time-frequency resource has been punctured or otherwise modified, the processing subordinate entity 204 may suitably forgo processing packets at that resource or otherwise suitably process the packets as indicated in the control information 508. For example, the regular user 502 may zero out the log-likelihood-ratio (LLR) for the punctured time-frequency resource elements. When the assignments are post-processed, the regular user 502 can determine, in accordance with the information on the thin control channel 506, to wipe out the symbols it has buffered during the TTI corresponding to the punctured resources.

In a further aspect, the control information 508 may include information for the LoLat user 504 about its grant. In various examples, this may be the same information as used to inform the regular users 502 about their resource modification, or this may be separate information tailored for the LoLat user 504. The control information 508 may further include information identifying the LoLat user 504 for whom the LoLat downlink data is directed, information to assist the LoLat user 504 in receiving the included downlink data (e.g., identification of the particular time-frequency resource allocated, modulation and coding scheme, etc.), or any other suitable information directed to the LoLat user 504.

For the LoLat users 504, the short TTI may be used, as illustrated by the relatively shorter width, in the time dimension, of the time-frequency resources occupied by these LoLat users 504. That is, some users, or some types of communication may benefit from, or even require, lower latency than might be available from the usage of the long (non-LoLat) TTI. Accordingly, by utilizing a short TTI, lower latency may be achieved. The duration of information symbols carried within either of the long or short TTIs may also take any suitable duration, with one example being a 10 μs duration for each symbol. In an example wherein orthogonal frequency division multiplexing is adopted, an additional 1 μs cyclic prefix may be added to the symbol duration.

In various aspects of the disclosure, the information on the thin control channel 506 may include other information beyond the control information 508 for re-allocating time-frequency resources, as described above. For example, the thin control channel 506 may in some examples carry grant information indicating what time-frequency resources are granted to the regular user(s) 502. Of course, another channel or channels may be utilized for the grant of long TTI downlink resources. That is, in some examples, a separate grant channel (not illustrated) may be utilized to assign resources to the regular users 502.

By utilizing this scheme, the regular users 502 may generally utilize the long TTI, and may further utilize a suitable processing timeline. The processing timeline may be somewhat on the longer side, as extremely fast turnaround might not be needed for the regular users 502. On the other hand, LoLat users 504 may generally utilize the short TTI, and may further utilize a fast-turnaround processing timeline.

Figure 7:
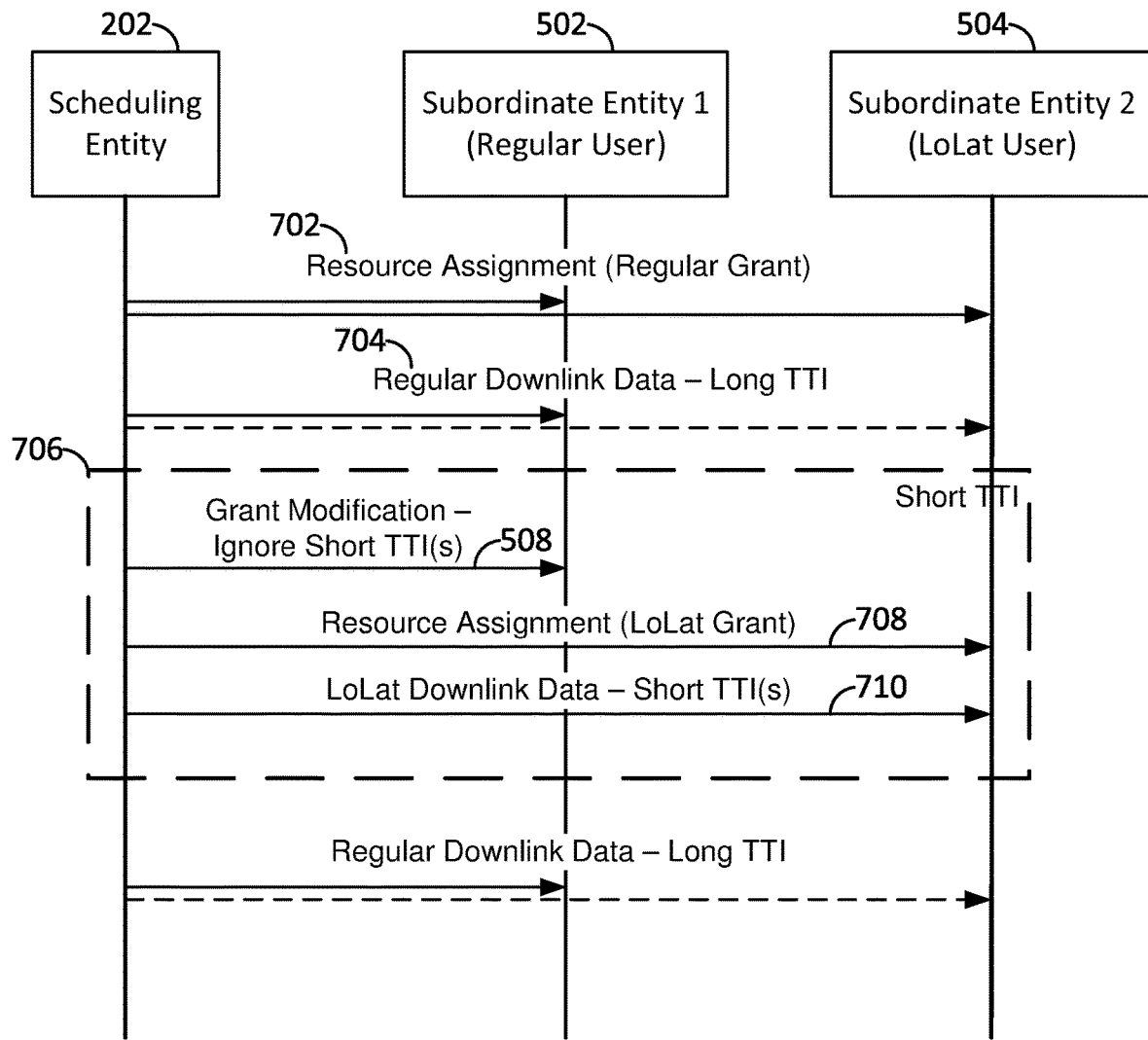
FIG. 7 is a call flow diagram illustrating an example of multiplexing downlink communications of different transmission time intervals (TTIs) utilizing a thin control channel according to some embodiments.

FIG. 7 is a call flow diagram illustrating an exemplary resource assignment and re-assignment procedure as it might occur in accordance with one example for multiplexing downlink data with different latency targets. In this illustration, time moves forward in the downward direction, and communication signals between the illustrated entities are denoted with arrows between the lines below the respective entities. As illustrated, a scheduling entity 202 is in communication with a plurality of subordinate entities 204, including a regular user 502 and a LoLat user 504.

Figure 8:
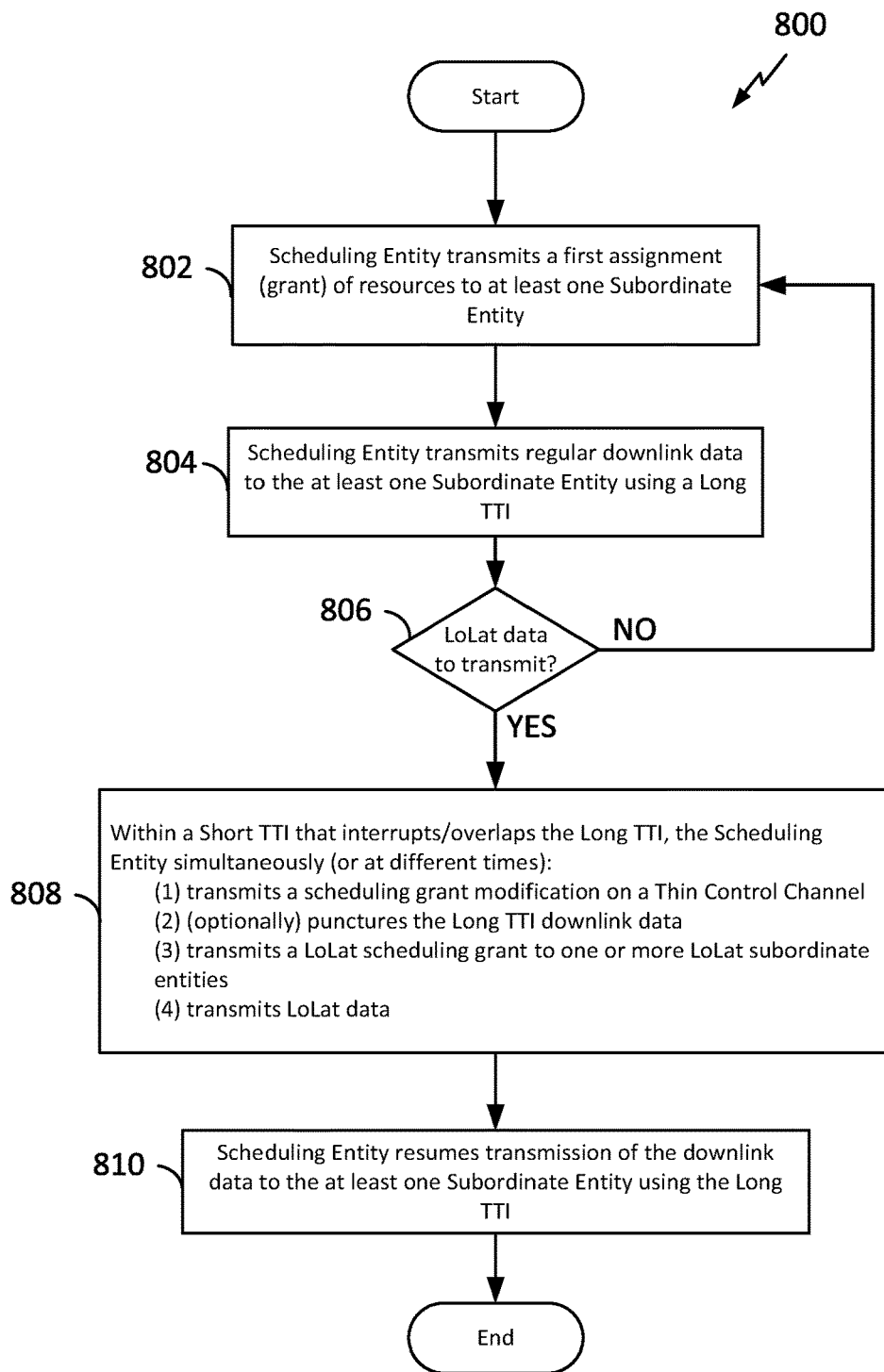
FIG. 8 is a flow chart illustrating an example of multiplexing downlink communications of different TTIs utilizing a thin control channel from the point of view of a scheduling entity, according to some embodiments.

FIG. 7 is described below in conjunction with a flow chart illustrated in FIG. 8. That is, FIG. 8 is a flow chart illustrating an exemplary process 800 for resource assignment and re-assignment in accordance with some aspects of the present disclosure. The process 800 is described from the point-of-view of a scheduling entity 202, and may accordingly, as described in conjunction with FIG. 7, be operational at the scheduling entity described above in conjunction with FIGS. 2 and/or 3. In other examples within the scope of the present disclosure, the process 800 may be operational by a general purpose processor, a processing system 314 as described above and illustrated in FIG. 3, or any suitable means for carrying out the described functions.

At block 802, the scheduling entity 202 may transmit a first assignment or grant 702 of time-frequency resources to at least one subordinate entity. Any suitable downlink control channel may be utilized at block 802 for the first resource assignment 702, such as a downlink assignment channel. For example, the first assignment or grant 702 may occur at the start of the long TTI, or in other examples, the first assignment or grant might span the whole long TTI. In the case that the first assignment or grant 702 spans the whole long TTI, then any modification to the resource assignment or grant may be processed at the end of the long TTI. Here, the first resource assignment 702 may be configured to indicate which time-frequency resource or resources are assigned to the subordinate entity for regular receiving downlink data transmissions, that is, transmissions utilizing the long TTI. In accordance with the first resource assignment 702, at block 804, the scheduling entity 202 may transmit regular downlink data 704 to the at least one subordinate entity (e.g., the subordinate entities 502 and 504) utilizing the long TTI. Here, with reference to FIG. 6, this regular downlink data 704 may correspond to the transmissions to regular users 502. As illustrated in FIG. 7 with the dashed-line arrow, regular downlink data may optionally be transmitted to the second subordinate entity 504, depending on the contents of the first resource assignment 702 and whether the second subordinate entity 504 is configured to receive downlink data transmissions utilizing the long TTI.

The blocks 802 and 804 may repeat, or be iterated a plurality of times in various examples, as regular downlink data 704 may continue to be transmitted to the subordinate entities consuming the regular downlink data 704. For example, at block 806, the scheduling entity 202 may determine that there is no LoLat data to transmit to any scheduling entity or entities. However, at any given time, it may arise that the scheduling entity 202 may wish to transmit LoLat data to the LoLat user 504. For example, at block 806, the scheduling entity 202 may determine that there is LoLat data to transmit to one or more scheduling entities. Accordingly, at block 808, the scheduling entity 202 may perform a set of actions, the set denoted in FIG. 7 with the dashed-line box 706, during the duration of a short TTI that interrupts or overlaps the long TTI corresponding to the first resource assignment. In some examples, these actions in the box 706 may be performed simultaneously. However, as described above, any or all of the actions in the box 706 may in other examples be offset in time, wherein post-processing of the data and control channels can enable the processing of the LoLat data and scheduling assignments by all of the subordinate entities in the network.

That is, at block 808, the scheduling entity 202 may transmit a scheduling grant modification 508 (see FIGS. 6-7) on a downlink thin control channel 506, as described above. The scheduling grant modification 508 may include information informing the regular users 502, and in some examples, also the LoLat user(s) 504 of the modification of the grant of time-frequency resources, so that the respective subordinate entities may properly decode the downlink data. Furthermore, the scheduling entity 202 may transmit a second assignment or grant of time-frequency resources 708 (see FIG. 7) to the LoLat user 502. The particular channel to utilize for the second resource assignment 708 is not illustrated in FIG. 6, but any suitable downlink control channel may be utilized for the second resource assignment 708. Still further, the scheduling entity 202 may transmit the LoLat downlink data 710 to the LoLat user 504 utilizing one or more short TTIs.

Once again, in some aspects of the disclosure, the transmission of the scheduling grant modification 508, the transmission of the second resource assignment or LoLat grant 708, and the transmission of the LoLat downlink data 710 may each occur simultaneously, that is, within the same short TTI, as illustrated in FIG. 6. Of course, as described above, in other aspects of the disclosure, these transmissions need not necessarily occur during the same short TTI. That is, the receiving subordinate entities 204 may include a data buffer within their memory 405, into which the contents of the scheduling grant modification 508, the second resource assignment 708, and the LoLat downlink data 710 may be stored for post-processing (e.g., at the end of the ongoing long TTI, or at any suitable time).

At block 810, the scheduling entity may resume transmission of the downlink data utilizing the long TTI. Here, in some examples, the resumption of long-TTI downlink data transmission may take place upon completion of the transmission of the LoLat user data. However, it is not necessarily the case that all of the long-TTI downlink data ceased during transmission of the LoLat user data. For example, referring to FIG. 6, in at least some of the short TTIs utilized for the transmission of the LoLat user data, long-TTI downlink data may simultaneously be transmitted on different time-frequency resources. That is, in some aspects of the disclosure, only a portion of subcarriers, channels, or bandwidth may be utilized for LoLat data, while other portions of subcarriers, channels, or bandwidth may be utilized to continue transmitting long-TTI downlink data.

By utilizing the above scheme, the thin control channel 506 can enable a scheduling entity to multiplex at least two different data types or categories, having different TTIs, for downlink transmission to a set of subordinate entities.

UL/UL Multiplexing

Figure 9:
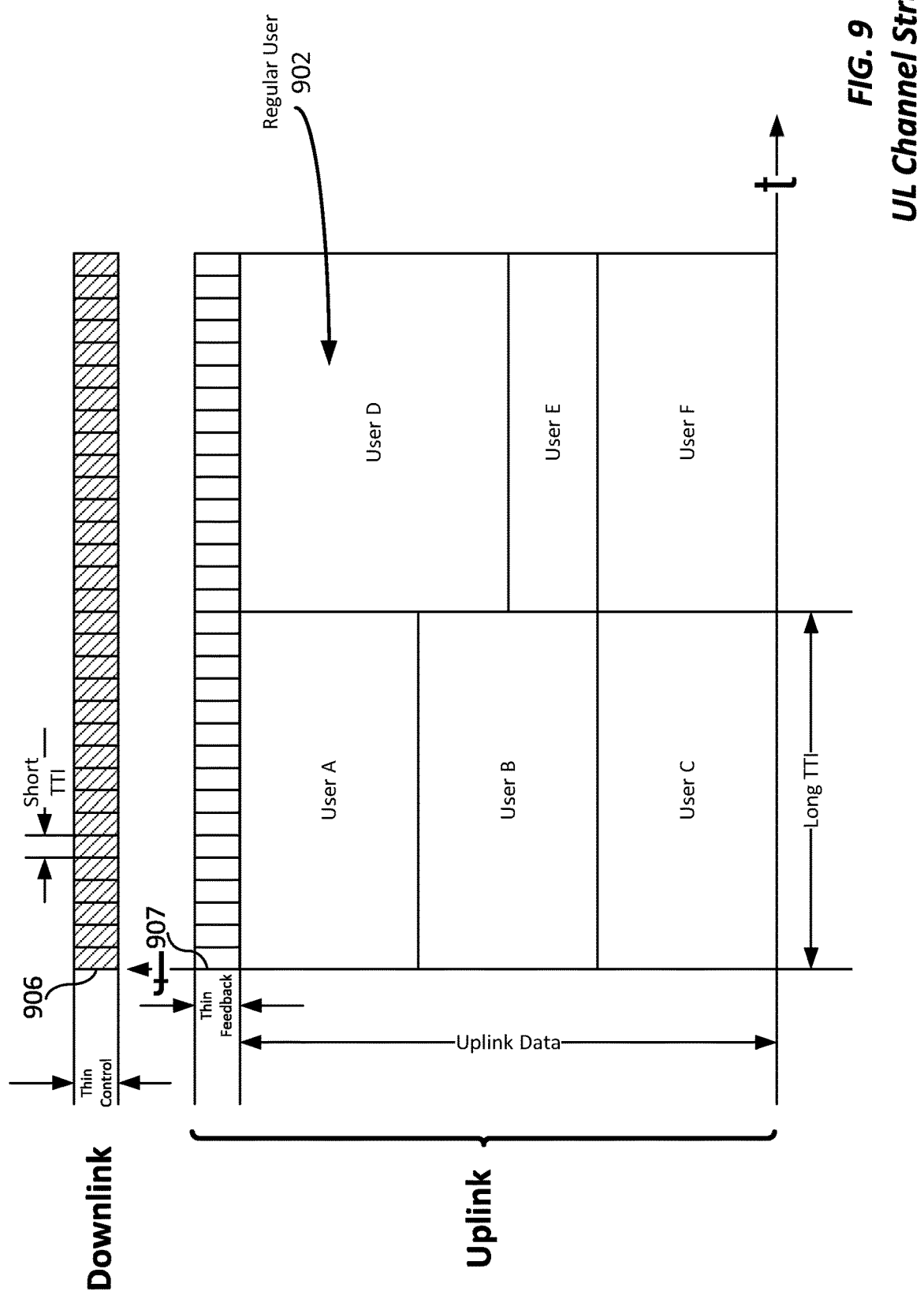
FIG. 9 is a schematic diagram illustrating an example of a synchronous multiple access channel structure for an uplink transmission including a thin control channel according to some embodiments.

FIG. 9 is a schematic illustration of an example of a synchronous multiple access channel structure including a thin control channel as it may be implemented according to further aspects of the present disclosure. In this illustration, the channel structure may be applicable to an uplink data transmission, i.e., a transmission from a subordinate entity to a scheduling entity. Of course, this channel structure is not limited to such a scheme, but rather may be generalized to be applicable to any link where the receiving device is scheduling the traffic.

As in the downlink example described above, here, uplink time-frequency channel resources for various users of the air interface occupy given areas within the channel, as identified in the different blocks. For example, some of the time-frequency resources may be utilized by "regular" users 902, which have less stringent latency requirements for their communication. In the illustration, as one example, six regular users 902 labeled User A, B, C, D, E, and F are each scheduled time-frequency resources as indicated by their respectfully labeled blocks. Of course, in various examples any number of users may be scheduled the use of resources. Further, while in the illustration all of the time-frequency resources are shown being assigned to regular users, in various examples some or even all of the time-frequency resources may be unassigned, or assigned for another purpose other than for regular user data.

In the context of the present disclosure, a regular user 902 may be a subordinate entity 204 that receives a resource assignment from a scheduling entity 202, where the resource assignment indicates for the subordinate entity 204 to utilize a long TTI. Such regular users 902 may be more tolerant to latency in their communication, and may in some examples be more optimized for capacity. Accordingly, these users may utilize such longer TTIs for packets that can tolerate more latency than other users or other types of communication that might require LoLat communication. A long TTI may broadly be any TTI that is longer than a short TTI, described in further detail below. In some examples, a long TTI may be a TTI that has a duration of a plurality of data symbols, or time slots. Some non-limiting examples of a long TTI may have a duration of 100 µs, 240 µs, or 1 ms. Of course, any suitable duration for a long TTI may be utilized within the scope of the disclosure.

Furthermore, as illustrated in FIG. 9, in addition to the uplink data traffic channels used by the regular users 902, a "thin" feedback channel 907 in the uplink direction may be utilized as illustrated. Here, the thin feedback channel 907 may be the same as the thin feedback channel 214 described above and illustrated in FIG. 2. Within the present disclosure, the thin feedback channel may lie in one or more frequency sub-band(s) outside of (e.g., above) the frequency sub-bands utilized by the uplink traffic transmissions, such as the allocated time-frequency resources described above for regular users A-F 902. The width of the thin feedback channel 907 in the frequency direction may be reduced or minimized so as to reduce or minimize the amount of overhead utilized by the thin feedback channel 907.

Still further, as illustrated in FIG. 9, in addition to the uplink traffic and feedback channels, a thin control channel 906 may be utilized in the downlink direction as illustrated. Here, the thin control channel 906 may be the same as one or both of the thin control channels 208/212 described above and illustrated in FIG. 2. Within the present disclosure, the thin control channel may lie in one or more frequency sub-band(s) outside of the frequency sub-bands utilized by the uplink traffic and feedback transmissions, such as the allocated time-frequency resources described above for regular users A-F 902 and the thin feedback channel 907. For example, in a frequency division duplex (FDD) system, the thin control channel 906 on the downlink may be in a different band than the uplink traffic and feedback channels, on in the same band but on a different frequency channel. The width of the thin control channel 906 in the frequency direction may be reduced or minimized so as to reduce or minimize the amount of overhead utilized by the control channel 906. In a further aspect, all active users (e.g., subordinate entities 204 including but not necessarily limited to the regular users 902) in communication with the scheduling entity 202 that broadcasts the thin control channel 906 may monitor (and, in some examples, buffer) the thin control channel 906 shown herein.

As illustrated in FIG. 9, each time slot, symbol, or unit of the thin control channel 906 may correspond to the duration of a short TTI. That is, in some examples, the short TTI may correspond to the time duration of a single symbol. Some non-limiting examples of a short TTI may have a duration of 10 µs, 20 µs, 100 µs, or any other suitable duration that is shorter than the long TTI. In some examples, the long TTI may represent an integer multiple of short TTIs. In some examples, a common symbol duration may be utilized within both the long TTI and the short TTI, or in other examples, different symbol durations may be utilized within the long TTI and the short TTI.

Figure 10:
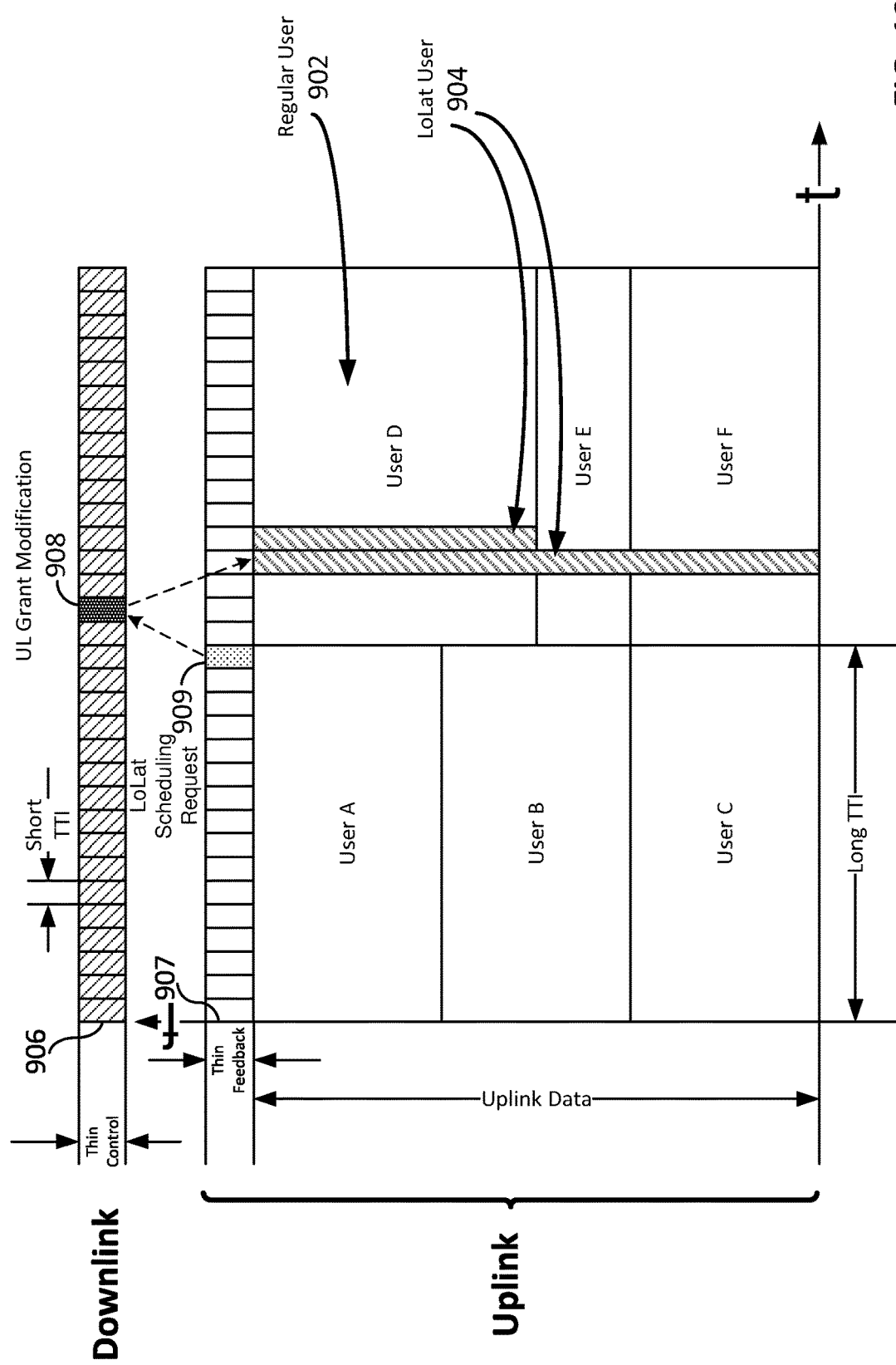
FIG. 10 is a schematic diagram illustrating uplink/uplink multiplexing utilizing a thin control channel according to some embodiments.

Referring now to FIG. 10, an example is illustrated to show an exemplary scheme for multiple access transmissions (e.g., uplink transmissions) by subordinate entities, enabling multiplexing of the uplink transmissions from one or more subordinate entities utilizing a long TTI and uplink transmissions from one or more subordinate entities utilizing a short TTI. That is, a plurality of regular users 902 may be transmitting uplink communications utilizing an existing assignment of time-frequency resources. Here, any suitable control channel (not necessarily the thin control channel 906) in the downlink direction may be utilized to grant resources to the various entities in the network, such that those subordinate entities 204 may transmit long-TTI uplink data according to their respective assignments.

Here, it may be the case that a subordinate entity in the network wishes to transmit LoLat data. Here, in order to maintain orthogonality among a plurality of subordinate entities, a central, scheduling entity may be utilized to schedule both the LoLat and long-TTI uplink transmissions by each of the subordinate entities, and they may generally not randomly transmit uplink data without receiving assigned time-frequency resources for such transmissions. Accordingly, when a particular subordinate entity 204 determines that it has traffic (e.g., high priority traffic) that it wishes to be transmitted with a lower latency, then the subordinate entity may transmit a LoLat scheduling request 909 on the thin feedback channel 907. The LoLat scheduling request 909 is illustrated as occupying a single short TTI, although this is not necessarily always the case, and various LoLat scheduling requests might occupy any suitable number of short TTIs or symbol lengths. The contents of the LoLat scheduling request 909 may include information about the LoLat data that the transmitting entity wishes to transmit, such as, for example, length, data type, priority, a buffer status report (BSR), a latency bound, reliability information, or any other suitable information relating to the LoLat data. In some examples, the LoLat scheduling request 909 may consist of a single bit, while in other examples, the LoLat scheduling request 909 may include a plurality of bits.

In response to the LoLat scheduling request 909, the receiving end of the LoLat scheduling request 909 (e.g., the scheduling entity 202) may accordingly determine to grant a scheduling adjustment. In this way, the scheduling entity 202 may make resources available for the requesting LoLat user 904 to make its LoLat uplink data transmission. Thus, the scheduling entity 202 may transmit, on the thin control channel 906, an uplink grant modification 908. This uplink grant modification 908 may notify the regular users 902 that their grant is being modified, and that the previously allocated long TTI time-frequency resources will be punctured, and that the resources will not be used by the regular users 902. Here, puncturing the resources of the regular user 902 may in some examples mean that the regular user 902 ceases transmitting during the time associated with the re-assigned short TTI. In other examples, where one or more means of channel multiplexing may be used (including but not limited to frequency division multiplexing and code division multiplexing), puncturing the resources of the regular user 902 may mean that the regular user 902 ceases using punctured resources but may continue transmitting uplink data utilizing another frequency or another scrambling code, other than the resource previously granted to the LoLat user 904, in order to maintain orthogonality. As described above, the thin control channel 906 may be a point-to-multipoint broadcast channel monitored by all subordinate entities 204 in communication with the scheduling entity 202. In this way, any user or users having their formerly granted time-frequency resources punctured by the uplink grant modification 908 can be informed or instructed not to transmit their uplink transmission utilizing the particular time-frequency resource now allocated to a LoLat user 904.

Here, when the regular user data is punctured, it may be the case that some of the regular data is simply lost. In this example, forward error correction coding may be utilized to recover the user data in view of the lost symbols due to the puncturing. In another example, the subordinate entity transmitting the regular user data may implement rate matching to account for the puncturing of the regular user data. That is, the subordinate entity may modify a portion of the regular data utilizing a rate matching algorithm to account for the lost resources. Those of ordinary skill in the art will understand a rate matching procedure, so the implementation details thereof are not provided herein. However, in essence, a rate matching algorithm configures an encoding algorithm for the data (e.g., the regular user data) to fit into allocated physical resources. Thus, when the puncturing described above removes a portion of these resources, a rate matching algorithm may actively adjust the encoding (e.g., by adjusting a coding rate) to account for the reduced amount of resources.

In another aspect of the disclosure, rather than puncturing the time-frequency resources for the regular user data, the data from the regular user 902 and the data for the LoLat user 904 may overlap. That is, both uplink transmissions may occupy the same time-frequency resources. Here, the receiving entity may be configured to account for the interference that may occur, or in other examples, such interference may result in what may be considered acceptable data losses. In a further example, modification of the regular user data transmission 902 may be made to account for the overlapped transmissions, e.g., by adjusting the rate matching algorithm as described above.

In a further aspect, the uplink grant modification 908 may not only include grant modification information directed to the regular users 902, but in some examples may further include grant information directed to the requesting LoLat user 904 indicating that the punctured or otherwise indicated time-frequency resources have been allocated to the LoLat user 904. In another example within the scope of the present disclosure, the grant information directed to the requesting LoLat user 904 may be carried on an uplink grant channel (not illustrated) separated from, or different from the grant modification information directed to the regular users 902. That is, the thin control channel 906 may in some examples exclude grant information for the LoLat user 904, this information being transmitted on any suitable downlink channel readable by the requesting LoLat user 904. In any case, grant information directed to the requesting LoLat user 904 may include information identifying the LoLat user 904, identifying one or more time-frequency resources to use for the uplink LoLat data transmission, modulation and coding schemes, power control information, timing advance information, or any other suitable information relating to the granted resource for the requesting LoLat user 904.

In the illustration of FIG. 10, the LoLat user 904 transmits the LoLat scheduling request 909, but all subordinate entities, including the regular users 902, receive the uplink grant modification 908. Here, in a further aspect of the disclosure, the regular users 902 may be configured such that they are capable of decoding the uplink grant modification 908 relatively quickly, so that they can promptly cease transmitting (e.g., puncture their transmissions) during the re-allocated short TTI(s). In this way, the time-frequency resources may quickly be made available for the LoLat user 904 to transmit its LoLat symbols.

It may be observed that, compared to the downlink scheme described above and illustrated in FIG. 6, the uplink scheme described here and illustrated in FIG. 10 has a relatively higher latency. This latency may be due to a propagation delay for the uplink transmission of the LoLat scheduling request 909 to be received at the scheduling entity 202, a processing delay at the scheduling entity 202, a second propagation delay for the downlink transmission of the uplink grant modification 908 to be received at the subordinate entity 204, and a further delay until the allocated resources are available for the LoLat transmission.

Figure 11:
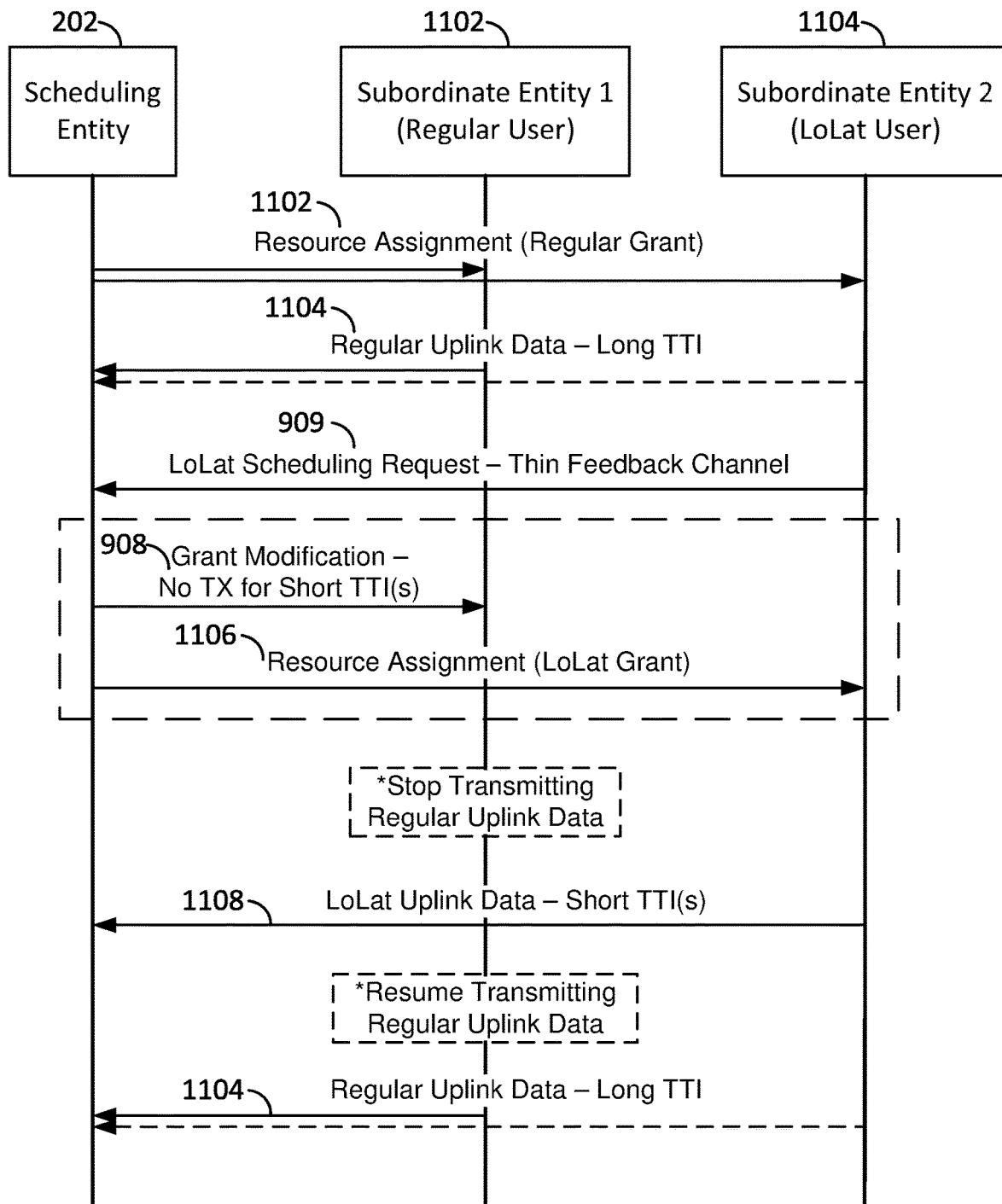
FIG. 11 is a call flow diagram illustrating an example of multiplexing uplink communications of different TTIs utilizing a thin control channel according to some embodiments.

FIG. 11 is a call flow diagram illustrating an exemplary resource assignment and re-assignment procedure as it might occur in accordance with one example for multiplexing uplink data with different latency targets. In this illustration, time moves forward in the downward direction, and communication signals between the illustrated entities are denoted with arrows between the lines below the respective entities. As illustrated, a scheduling entity 202 is in communication with a plurality of subordinate entities 204, including a regular user 902 and a LoLat user 904.

Figure 12:
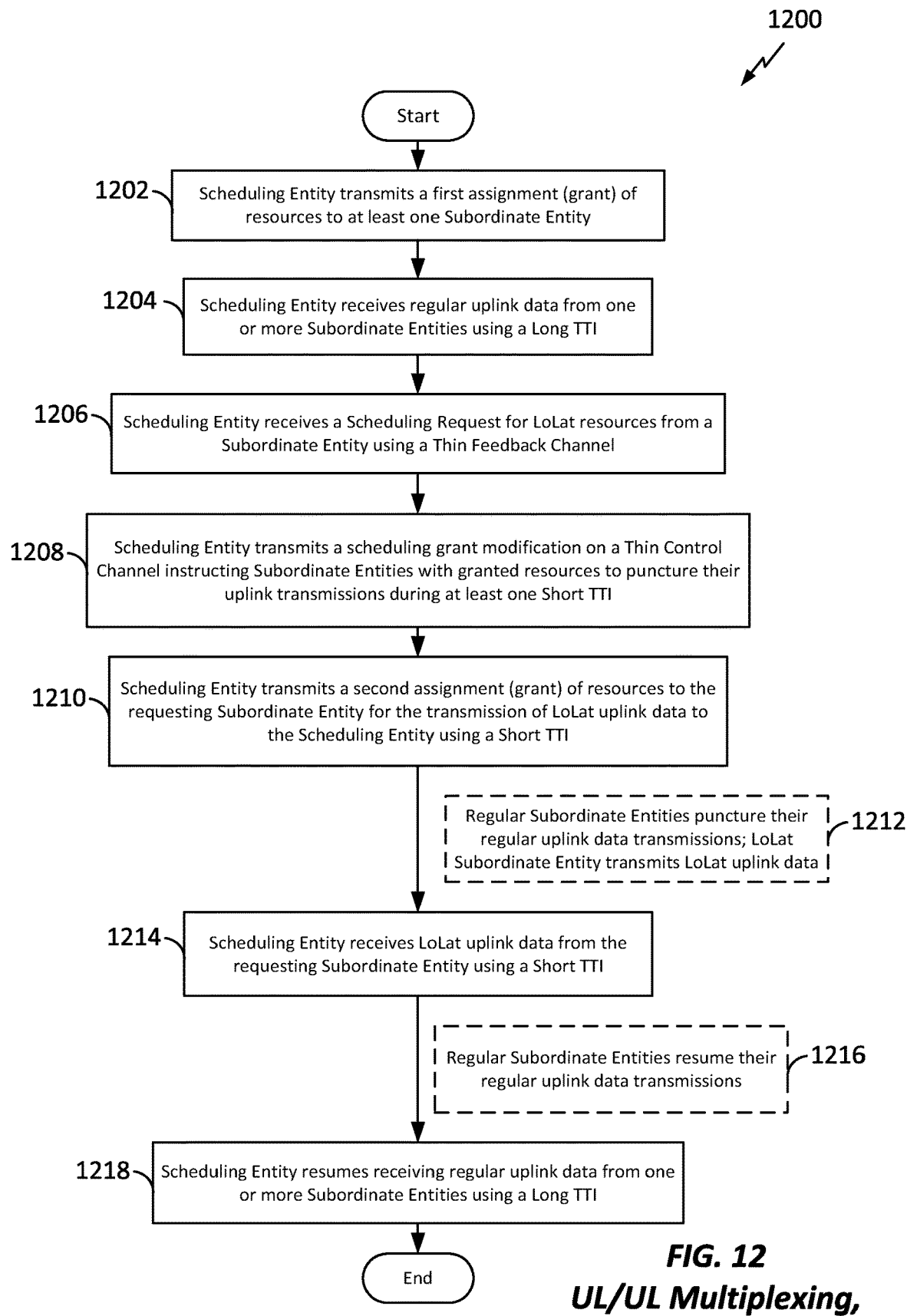
FIG. 12 is a flow chart illustrating an example of multiplexing uplink communications of different TTIs utilizing a thin control channel from the point of view of a scheduling entity, according to some embodiments.

FIG. 11 is described below in conjunction with a flow chart illustrated in FIG. 12. That is, FIG. 12 is a flow chart illustrating an exemplary process 1200 for resource assignment and re-assignment in accordance with some aspects of the present disclosure. The process 1200 is described from the point-of-view of a scheduling entity 202, and may accordingly, as described in conjunction with FIG. 11, be operational at the scheduling entity described above in conjunction with FIGS. 2 and/or 3. In other examples within the scope of the present disclosure, the process 1200 may be operational by a general purpose processor, a processing system 314 as described above and illustrated in FIG. 3, or any suitable means for carrying out the described functions.

At block 1202, the scheduling entity 202 may transmit a first assignment or grant 702 of time-frequency resources to at least one subordinate entity. Any suitable downlink control channel may be utilized at block 1202 for the first resource assignment 1102. Here, the first resource assignment 1102 may be configured to indicate which time-frequency resource or resources are assigned to the subordinate entity for regular uplink data transmissions, that is, transmissions utilizing the long TTI. In accordance with the first resource assignment 1102, at block 1204, the scheduling entity 202 may receive regular uplink data 1104 from the at least one subordinate entity (e.g., the subordinate entities 1102 and 1104) utilizing the long TTI. Here, with reference to FIG. 10, this regular uplink data 1104 may correspond to the transmissions from the regular users 902. As illustrated in FIG. 11 with the dashed-line arrow, regular uplink data may optionally be transmitted from the subordinate entity 1104, depending on the contents of the first resource assignment 1102 and whether the second subordinate entity 1104 is configured to transmit uplink data transmissions utilizing the long TTI.

The blocks 1202 and 1204 may repeat, or be iterated a plurality of times in various examples, as regular uplink data 1104 may continue to be transmitted from the subordinate entities. However, at any given time, it may arise that the subordinate entity 1104 (i.e., the LoLat user 904) may wish to transmit LoLat data to the scheduling entity 202. Accordingly, at block 1206, the scheduling entity 202 may receive a LoLat scheduling request 909 on the thin feedback channel 907 from the LoLat user 904 (i.e., the second subordinate entity 1104). The LoLat scheduling request 909 may include information identifying the requesting subordinate entity 1104, and including any pertinent information relating to the LoLat data desired to be transmitted.

At block 1208, the scheduling entity 202 may transmit an uplink scheduling grant modification 908 on the thin control channel 906. Here, the uplink scheduling grant modification 908 may instruct the regular users 902, such as the first subordinate entity 1102, having granted resources for long-TTI uplink transmissions, to puncture their uplink transmissions during at least one designated short TTI. Further, at block 1210, the scheduling entity 202 may transmit a second resource assignment or grant 1106 of time-frequency resources to the requesting subordinate entity 1104 (i.e., the LoLat user 904). Here, the second resource assignment 1106 may include information identifying the requesting subordinate entity 1104, and information identifying the time-frequency resources granted for the LoLat uplink transmission. In some examples, the transmission of the uplink scheduling grant modification 908 at block 1208, and the transmission of the second resource assignment 1106 at block 1210, may occur simultaneously. That is, these transmissions may be multiplexed, for example, utilizing different time-frequency resources. In other examples, these transmissions may be at different times, according to the details of a particular implementation.

Block 1212 represents operations at subordinate entities, such as the regular users 902 and LoLat user(s) 904. That is, in response to the uplink grant modification 908, the regular users 902 (i.e., the first subordinate entity 1102) may puncture their previously scheduled uplink data transmissions that utilize the long TTI. Further, in response to the second resource assignment 1106, the LoLat user(s) 904 (i.e., the second subordinate entity 1104) may transmit the LoLat uplink data 1108 utilizing the assigned time-frequency resources.

At block 1214, the scheduling entity 202 may receive the LoLat uplink data 1108 transmitted from the requesting subordinate entity 1104 utilizing the short TTI.

Block 1216 represents further operations at subordinate entities, such as the regular users 902 and, in some examples, LoLat user(s) 904. That is, the regular subordinate entities may resume their regular uplink data transmissions when transmission of the LoLat uplink data has been completed. Accordingly, at block 1218, the scheduling entity 202 may resume receiving regular uplink data from one or more subordinate entities utilizing the long TTI.

By utilizing the above scheme, the thin control channel 906 can enable a scheduling entity to multiplex at least two different data types or categories, having different TTIs, for uplink transmissions from a set of subordinate entities.

Interference Management

In a further aspect of the disclosure, by virtue of the thin control channel described herein above, not only may channels and users having different waveforms, latencies, and TTIs be multiplexed together. Further, effective interference management and link adaptation may be enabled. For example, while operating in a wireless communication network, the amount of interference that a mobile communication device may be subject to, may vary over time. Particularly in unlicensed or less coordinated deployments, such wireless communication devices may undergo excessive interference. In accordance with an aspect of the present disclosure, if a wireless communication device, such as the scheduling entity 202 and/or the subordinate entity 204 experiences excessive and/or time-varying interference, the receiving wireless communication device may transmit feedback to the transmitting device to indicate that an interference condition exists. This feedback information relating to interference may be transmitted on a suitable thin control channel, a thin feedback channel, or other suitable thin transmission channel as described in the present disclosure.

The feedback information transmitted by the receiving device that is experiencing the interference (e.g., the scheduling entity 202 and/or the subordinate entity 204) may include various suitable information, including but not limited to information about the interferer and/or interfering signal, time (persistency) of the interferer, frequency, power, spatial information, etc. The information transmitted by the receiving device can also include a channel quality indicator (CQI), which may indicate how poor the channel is in the presence of the interferer. Still further, the information transmitted may include a packet duration in each symbol, with a count-down field in each symbol.

Some existing CQI implementations, such as those in LTE or earlier communication standards, may be relatively computationally intensive. Thus, for 5G CQI feedback, in some aspects of the present disclosure, the amount of complexity of CQI computation may be desired to be reduced or simplified. To this end, the receiving device subject to interference and generating a CQI on a thin control channel or feedback channel transmission may not necessarily check all possible beamforming directions. That is, in some aspects of the present disclosure, the CQI reporting device may report what rank is feasible for transmissions, and under those hypotheses, what capacity the device sees, which may be reported to the receiving entity what modulation and coding scheme (MCS) the reporting entity can support. The CQI might in some examples be as simple as an indication that interference jumped by a determined amount, say 10 dB.

Referring again to FIG. 5, in the context of downlink transmissions, in the case that a regular user 502 is experiencing interference, e.g., from a jamming signal, the regular user 502 may transmit feedback on a thin feedback channel to tell the transmitting device (e.g., the scheduling entity 202) that it is experiencing interference. Here, the feedback may be configured to indicate to the scheduling entity 202 to abandon those packets due to a low likelihood of being properly decoded, or to request the scheduling entity 202 to alter its transmission strategy (e.g., the modulation, the coding scheme, the power, or otherwise). Thus, a thin control channel (and/or a thin feedback channel) can provide a fast feedback mechanism that can enable the transmitting device to perform more dynamic link adaptation.

In the case that a jamming signal is very short in duration, there may be little that a UE can accomplish in terms of dynamic adaptation of downlink transmissions utilizing the thin control channel. However, if a jammer is persistent, potentially wiping out one or more entire long TTI subframes, then such fast feedback to the scheduling entity can be taken into account by the scheduling entity for future transmissions. For example, just because one UE is subject to interference from a jamming signal, another UE may not. In this case, the scheduling entity may cease transmitting to the affected UE and may instead transmit to another user not suffering from the interference.

Figure 13:
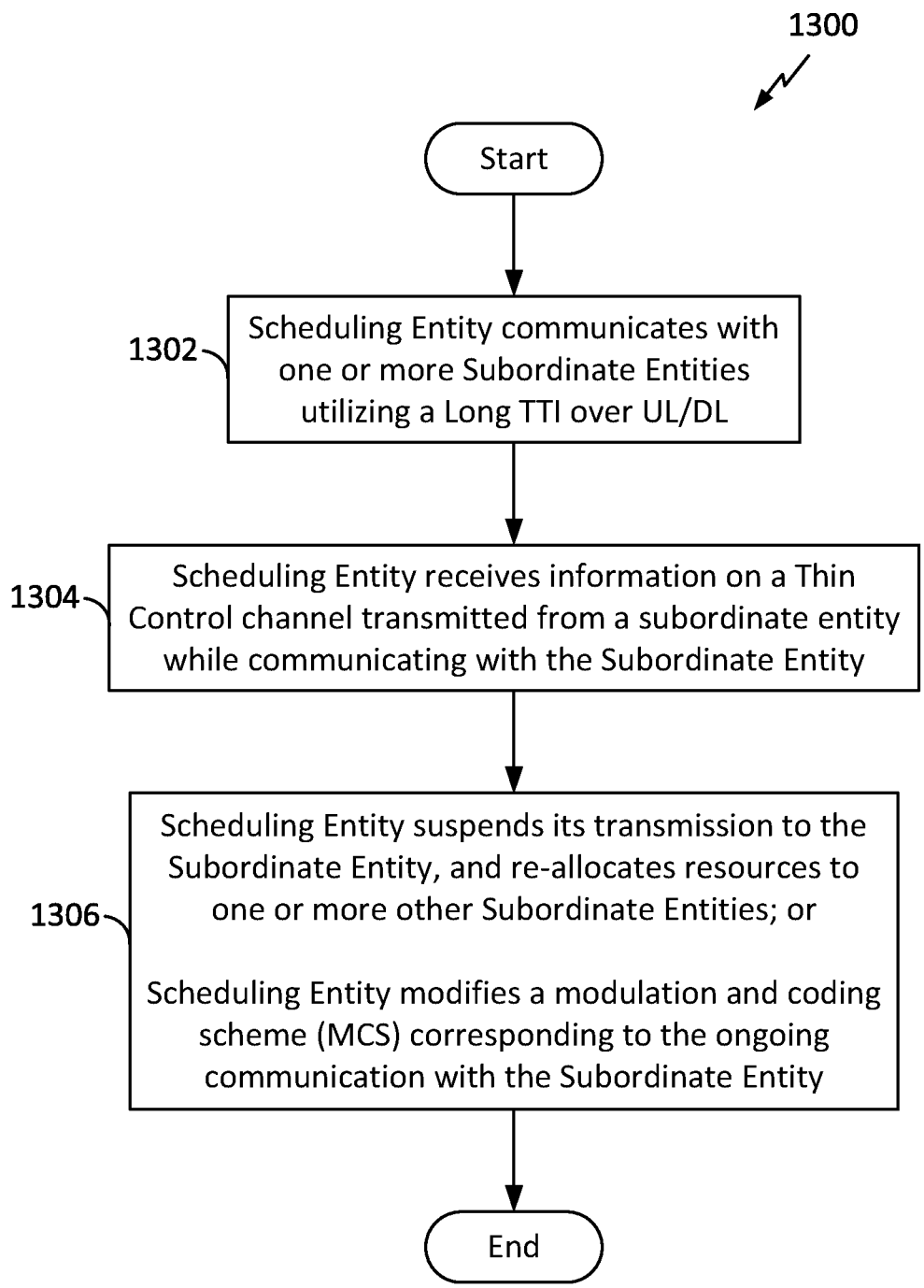
FIG. 13 is a flow chart illustrating an example of interference management utilizing a thin control channel according to some embodiments.

FIG. 13 is a flow chart illustrating an exemplary process 1300 for interference mitigation in accordance with some aspects of the disclosure. In some examples, the process 1300 may be implemented by a scheduling entity 202, as described above and illustrated in FIG. 3. In some examples, the process 1300 may be implemented by the processing system 314 described above and illustrated in FIG. 3, or by any suitable means for carrying out the described functions.

At block 1302, the scheduling entity 202 may communicate with one or more subordinate entities, such as the subordinate entity 204 described above and illustrated in FIG. 4, utilizing a long TTI for uplink and/or downlink communication. At block 1304, the scheduling entity 202 may receive information on a thin control channel transmitted from a subordinate entity 204. For example, the information received on the thin control channel may include one or more of a channel quality indicator (CQI), an interference metric (e.g., a parameter related to or directly indicating an amount of interference), or some other parameter or metric relating to interference experienced at the subordinate entity.

At block 1306, the scheduling entity 202 may accordingly suspend its communication with the subordinate entity 204. Here, in the case of downlink transmissions, the scheduling entity 202 may suspend its transmissions to the subordinate entity 204. In the case of uplink transmissions, a further handshake may take place, e.g., wherein the scheduling entity 202 instructs the subordinate entity 204 to suspend its uplink transmissions. In this way, a high error probability that may be associated with the interference condition being experienced by the subordinate entity can be avoided, and therefore, wasted resources can be reduced or avoided. In a further example, in addition to suspending the communication with the subordinate entity, the scheduling entity 202 may re-allocate resources formerly assigned to the responding subordinate entity 204, to one or more other subordinate entities. That is, the scheduling entity 202 may schedule communication with one or more other subordinate entities during the suspension of the communication with the subordinate entity.

In another example, rather than suspending the communication with the subordinate entity 204, the scheduling entity 202 may modify a modulation and coding scheme (MCS) of the ongoing communication with the subordinate entity 204. For example, the scheduling entity 202 may transmit control information to the subordinate entity 204 assigning the new MCS for the subordinate entity to utilize, the new MCS configured to reduce or avoid the effects of the interference reported by the subordinate entity 204.

As those skilled in the art will readily appreciate, various aspects described throughout this disclosure may be extended to any suitable telecommunication systems, network architectures and communication standards. By way of example, various aspects may be applied to UMTS systems such as W-CDMA, TD-SCDMA, and TD-CDMA. Various aspects may also be applied to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems, including those described by yet-to-be defined wide area network standards. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication, comprising:
   transmitting a resource assignment on a downlink assignment channel during a first transmission time interval (TTI), the resource assignment comprising a first grant of time-frequency resources for first data on an uplink data channel;
   receiving the first data on the uplink data channel during the first TTI;
   receiving a scheduling request configured to request a second grant of time-frequency resources for second data;
   transmitting control information on a downlink control channel during a second TTI shorter in duration than the first TTI and that overlaps a first portion of the first TTI, the control information comprising the second grant of time-frequency resources for the second data on the uplink data channel, the second grant of time-frequency resources occupying part of the time-frequency resources granted for the first data on the uplink data channel; and
   receiving the second data on the uplink data channel during a third TTI shorter in duration than the first TTI and that overlaps a second portion of the first TTI.

2. The method of claim 1, further comprising:
   transmitting an uplink grant modification during the second TTI, the uplink grant modification comprising information notifying at least one user equipment (UE) that the first grant is modified, and instructing the at least one UE to puncture transmissions of the first data in accordance with a timing of the second data.

3. The method of claim 1, further comprising:
transmitting an uplink grant modification during the second TTI,
wherein the transmitting the uplink grant modification and the transmitting the control information on the downlink control channel are performed at the same time.

4. The method of claim 1, further comprising:
transmitting an uplink grant modification during the second TTI,
wherein the transmitting the uplink grant modification comprises transmitting the uplink grant modification on the downlink control channel.

5. The method of claim 1, wherein the uplink data channel, and the downlink control channel are separated in frequency from one another.

6. An apparatus configured for wireless communication, comprising:
at least one processor;
a computer-readable medium communicatively coupled to the at least one processor; and
a transceiver communicatively coupled to the at least one processor,
wherein the at least one processor and the computer-readable medium are configured to:
utilize the transceiver to transmit a resource assignment on a downlink assignment channel during a first transmission time interval (TTI), the resource assignment comprising a first grant of time-frequency resources for first data on an uplink data channel;
utilize the transceiver to receive the first data on the uplink data channel during a first TTI;
utilize the transceiver to receive a scheduling request configured to request a second grant of time-frequency resources for second data;
utilize the transceiver to transmit control information on a downlink control channel during a second TTI shorter in duration than the first TTI and that overlaps a first portion of the first TTI, the control information comprising the second grant of time-frequency resources for the second data on the uplink data channel, the second grant of time-frequency resources occupying part of the time-frequency resources granted for the first data on the uplink data channel; and
utilize the transceiver to receive the second data on the uplink data channel during a third TTI shorter in duration than the first TTI and that overlaps a second portion of the first TTI.

7. The apparatus of claim 6, wherein the at least one processor and the computer-readable medium are further configured to:
utilize the transceiver to transmit an uplink grant modification during the second TTI, the uplink grant modification comprising information notifying at least one user equipment (UE) that the first grant is modified, and instructing the at least one UE to puncture transmissions of the first data in accordance with a timing of the second data.

8. The apparatus of claim 6, wherein the at least one processor and the computer-readable medium are further configured to:
utilize the transceiver to transmit an uplink grant modification during the second TTI, and wherein the at least one processor is further configured to utilize the transceiver to transmit the uplink grant modification and to transmit the control information on the downlink control channel at the same time.

9. The apparatus of claim 6, wherein the at least one processor and the computer-readable medium are further configured to:
utilize the transceiver to transmit an uplink grant modification during the second TTI, and
wherein the at least one processor, being configured to transmit the uplink grant modification, is further configured to transmit the uplink grant modification on the downlink control channel.

10. The apparatus of claim 6, wherein the uplink data channel, and the downlink control channel are separated in frequency from one another.

11. An apparatus configured for wireless communication, comprising:
means for transmitting a resource assignment on a downlink assignment channel during a first transmission time interval (TTI), the resource assignment comprising a first grant of time-frequency resources for first data on an uplink data channel;
means for receiving first data on the uplink data channel during the first TTI;
means for receiving a scheduling request configured to request a second grant of time-frequency resources for second user data;
means for transmitting control information on a downlink control channel during a second TTI shorter in duration than the first TTI and that overlaps a first portion of the first TTI, the control information comprising the second grant of time-frequency resources for the second data on the uplink data channel, the second grant of time-frequency resources occupying part of the time-frequency resources granted for the first data on the uplink data channel; and
means for receiving the second data on the uplink data channel during a third TTI shorter in duration than the first TTI and that overlaps a second portion of the first TTI.

12. The apparatus of claim 11, further comprising:
means for transmitting an uplink grant modification during the second TTI, the uplink grant modification comprising information notifying at least one user equipment (UE) that the first grant is modified, and instructing the at least one UE to puncture transmissions of the first data in accordance with a timing of the second data.

13. The apparatus of claim 11, further comprising:
means for transmitting an uplink grant modification during the second TTI,
wherein the means for transmitting the uplink grant modification and the means for transmitting the control information on the downlink control channel are configured to transmit the uplink grant modification and the control information at the same time.

14. The apparatus of claim 11, further comprising:
means for transmitting an uplink grant modification during the second TTI,
wherein the means for transmitting the uplink grant modification comprises transmitting the uplink grant modification on the downlink control channel.

15. The apparatus of claim 11, wherein the uplink data channel and the downlink control channel are separated in frequency from one another.

16. A non-transitory computer-readable medium comprising computer-executable code, comprising:
   instructions for causing a computer to transmit a resource assignment on a downlink assignment channel during a first transmission time interval (TTI), the resource assignment comprising a first grant of time-frequency resources for first data on an uplink data channel, the first TTI corresponding to a minimum duration for a unit of information that can independently be decoded;
   instructions for causing a computer to receive first data on the uplink data channel during the first TTI;
   instructions for causing a computer to receive a scheduling request configured to request a second grant of time-frequency resources for second data;
   instructions for causing a computer to transmit control information on a downlink control channel during a second TTI shorter in duration than the first TTI and that overlaps a first portion of the first TTI, the control information comprising the second grant of time-frequency resources for the second data on the uplink data channel, the second grant of time-frequency resources occupying part of the time-frequency resources granted for the first data on the uplink data channel; and
   instructions for causing a computer to receive the second data on the uplink data channel during a third TTI shorter in duration than the first TTI and that overlaps a second portion of the first TTI.

17. The non-transitory computer-readable medium of claim 16, further comprising:
   instructions for causing a computer to transmit an uplink grant modification during the second TTI, the uplink grant modification comprising information notifying at least one user equipment (UE) that the first grant is modified, and instructing the at least one UE to puncture transmissions of the first data in accordance with a timing of the second data.

18. The non-transitory computer-readable medium of claim 16, further comprising:
   instructions for causing a computer to transmit an uplink grant modification during the second TTI; and
   instructions for causing a computer to transmit the uplink grant modification and to transmit the control information on the downlink control channel at the same time.

19. The non-transitory computer-readable medium of claim 16, further comprising:
   instructions for causing a computer to transmit an uplink grant modification during the second TTI,
   wherein the instructions for causing a computer to transmit the uplink grant modification, are further configured to transmit the uplink grant modification on the downlink control channel.

20. The non-transitory computer-readable medium of claim 16, wherein the uplink data channel, and the downlink control channel are separated in frequency from one another.

* * * * *